United States Patent
Ehrman et al.

(10) Patent No.: US 11,080,643 B2
(45) Date of Patent: Aug. 3, 2021

(54) CARGO SENSORS, CARGO-SENSING UNITS, CARGO-SENSING SYSTEMS, AND METHODS OF USING THE SAME

(71) Applicant: I.D. SYSTEMS, INC., Woodcliff Lake, NJ (US)

(72) Inventors: Michael Ehrman, Woodcliff Lake, NJ (US); Chris Wolfe, Woodcliff Lake, NJ (US)

(73) Assignee: I.D. Systems, Inc., Woodcliff Lake, NJ (US)

( * ) Notice: Subject to any disclaimer, the term of this patent is extended or adjusted under 35 U.S.C. 154(b) by 0 days.

(21) Appl. No.: 16/588,223

(22) Filed: Sep. 30, 2019

(65) Prior Publication Data

US 2020/0104785 A1    Apr. 2, 2020

Related U.S. Application Data

(63) Continuation-in-part of application No. 16/145,594, filed on Sep. 28, 2018.

(51) Int. Cl.
| | |
|---|---|
| *G06K 9/00* | (2006.01) |
| *G06Q 10/08* | (2012.01) |
| *G06Q 50/28* | (2012.01) |
| *G01S 17/88* | (2006.01) |
| *G01S 17/04* | (2020.01) |
| *G06T 7/00* | (2017.01) |

(52) U.S. Cl.
CPC ............ *G06Q 10/083* (2013.01); *G01S 17/04* (2020.01); *G01S 17/88* (2013.01); *G06Q 50/28* (2013.01); *G06T 7/0008* (2013.01)

(58) Field of Classification Search
CPC .................................................. G06K 9/00771
See application file for complete search history.

(56) References Cited

U.S. PATENT DOCUMENTS 6,281,797 B1 * 8/2001 Forster .................. G01S 5/0018
340/438
7,015,824 B2 * 3/2006 Cleveland ............... G01S 15/88
340/686.1

(Continued)

FOREIGN PATENT DOCUMENTS

WO     2005111960 A2    11/2005

OTHER PUBLICATIONS

International Search Report dated Dec. 31, 2019 for PCT/US19/53869 filed Sep. 30, 2019.

(Continued)

*Primary Examiner* — Avinash Yentrapati
(74) *Attorney, Agent, or Firm* — Troutman Pepper Hamilton Sanders LLP; James E. Schutz; Brennan M. Carmody

(57) ABSTRACT

A cargo-sensing unit including: an image sensor; a transceiver; at least one processor; and a memory having stored thereon computer program code that, when executed by the processor, controls the at least one processor to: receive, from a controlling server and through the transceiver, an instruction to capture an image of cargo space within a cargo container; control the image sensor to capture an image of the cargo space in response to receiving the instruction; and operate in accordance with a determined cargo container status based on an analysis of the captured image.

19 Claims, 16 Drawing Sheets

(56) References Cited

U.S. PATENT DOCUMENTS

| | | | |
|---|---|---|---|
| 7,421,112 B2* | 9/2008 | Calver | G01S 17/04 |
| | | | 382/154 |
| 7,746,379 B2 | 6/2010 | Jesson et al. | |
| 9,007,209 B1 | 4/2015 | Ehrman et al. | |
| 9,330,557 B2 | 5/2016 | Ehrman et al. | |
| 2003/0219146 A1* | 11/2003 | Jepson | G06T 7/251 |
| | | | 382/103 |
| 2004/0125217 A1* | 7/2004 | Jesson | G06Q 10/087 |
| | | | 348/231.3 |
| 2004/0140886 A1* | 7/2004 | Cleveland | G01S 7/52006 |
| | | | 340/431 |
| 2004/0151342 A1* | 8/2004 | Venetianer | G06T 7/11 |
| | | | 382/103 |
| 2005/0199782 A1 | 9/2005 | Calver et al. | |
| 2005/0253710 A1* | 11/2005 | Eskildsen | G08B 13/08 |
| | | | 340/545.5 |
| 2006/0268111 A1* | 11/2006 | Zhang | G01S 3/7864 |
| | | | 348/169 |
| 2007/0031005 A1* | 2/2007 | Paragios | G06T 7/254 |
| | | | 382/103 |
| 2008/0025565 A1* | 1/2008 | Zhang | G06K 9/3241 |
| | | | 382/103 |
| 2008/0247599 A1* | 10/2008 | Porikli | G06K 9/00771 |
| | | | 382/103 |
| 2009/0110236 A1* | 4/2009 | Huang | G06T 7/277 |
| | | | 382/103 |
| 2009/0147074 A1* | 6/2009 | Getty | H04N 13/275 |
| | | | 348/51 |
| 2010/0296698 A1* | 11/2010 | Lien | G06T 7/20 |
| | | | 382/103 |
| 2012/0314059 A1* | 12/2012 | Hoffmann | G06T 7/0004 |
| | | | 348/135 |
| 2013/0342653 A1* | 12/2013 | McCloskey | H04N 13/204 |
| | | | 348/46 |
| 2014/0036072 A1* | 2/2014 | Lyall | G06K 9/00771 |
| | | | 348/143 |
| 2014/0058772 A1* | 2/2014 | Moskos | G06Q 10/0833 |
| | | | 705/6 |
| 2015/0213705 A1* | 7/2015 | Ehrman | G08B 21/182 |
| | | | 340/541 |
| 2015/0248590 A1* | 9/2015 | Li | G06T 7/194 |
| | | | 382/103 |
| 2016/0050356 A1* | 2/2016 | Nalepka | G06K 9/00791 |
| | | | 348/148 |
| 2017/0213339 A1* | 7/2017 | Hibbard | G06T 7/0012 |
| 2017/0262717 A1 | 9/2017 | Drazan et al. | |
| 2017/0349166 A1* | 12/2017 | Anderson | B60W 30/02 |
| 2017/0372484 A1 | 12/2017 | Carlson et al. | |
| 2018/0090937 A1* | 3/2018 | Ehrman | H02J 3/383 |
| 2019/0114577 A1* | 4/2019 | Kilburn | G06F 9/542 |

OTHER PUBLICATIONS

International Search Report dated Jan. 30, 2020 for PCT/US19/53128 filed Sep. 26, 2019.

* cited by examiner

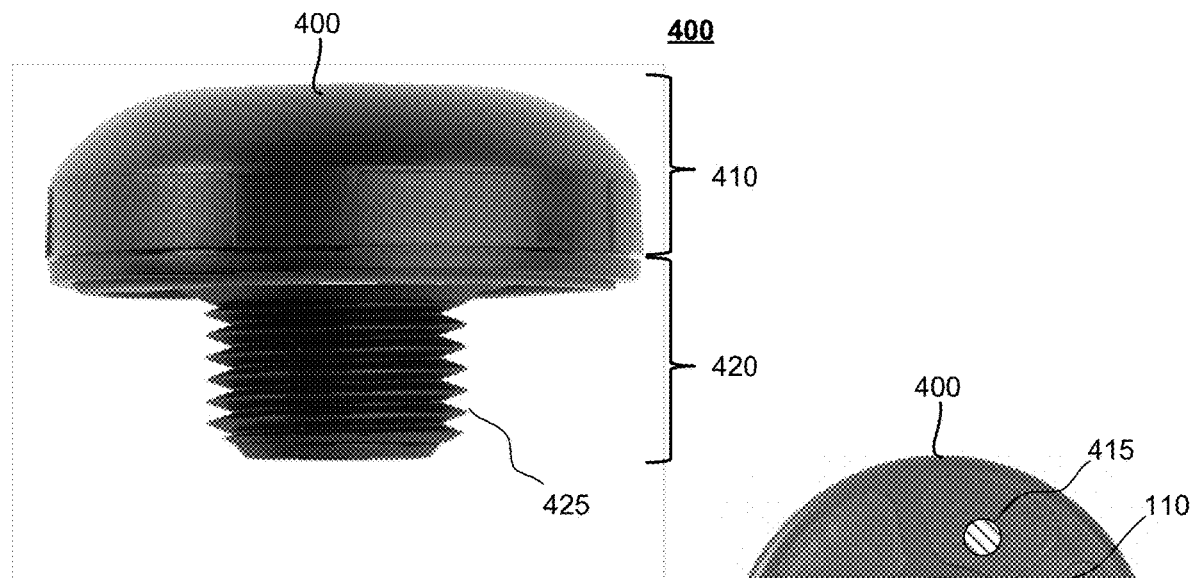
FIG. 4A
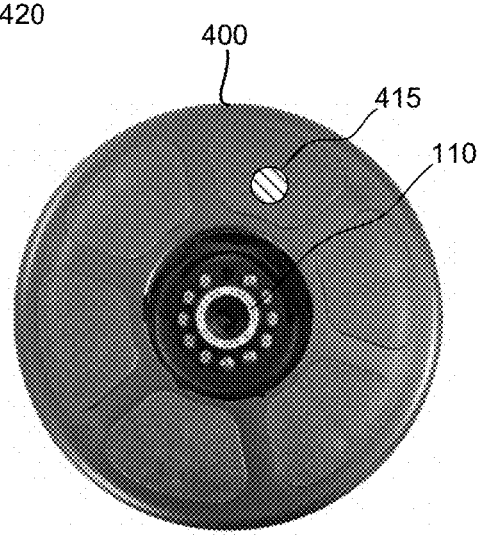
FIG. 4B
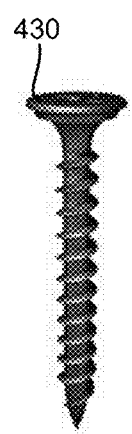 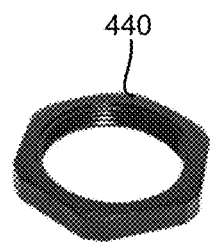
FIG. 4C

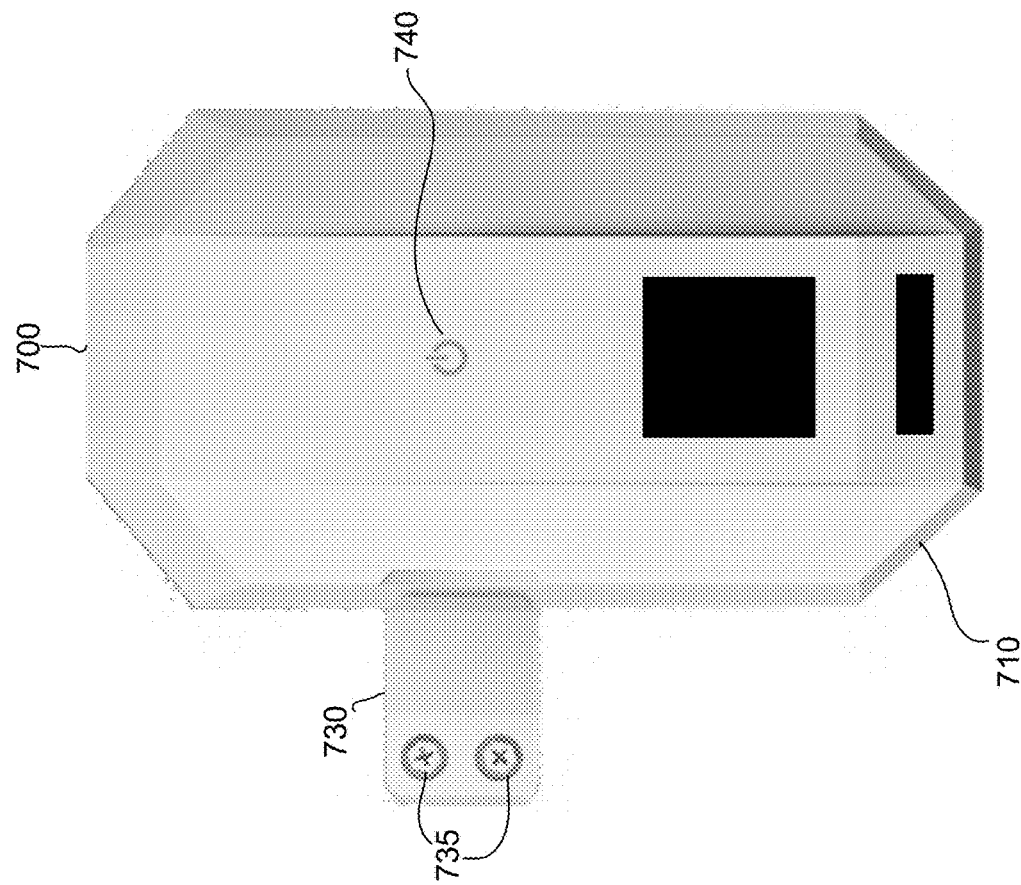
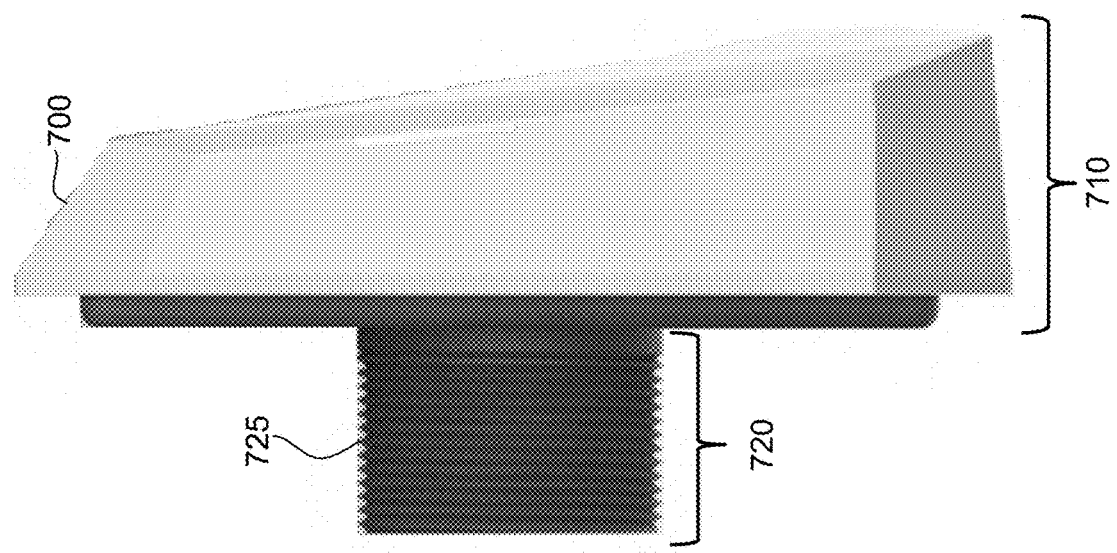
FIG. 7B
FIG. 7A

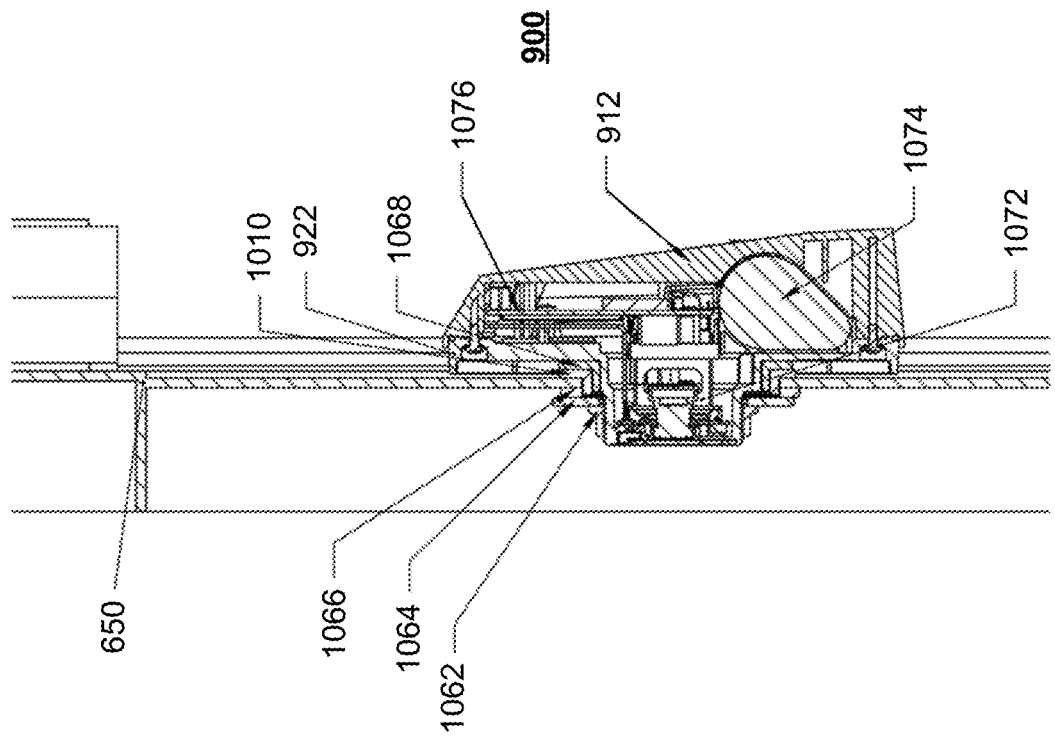
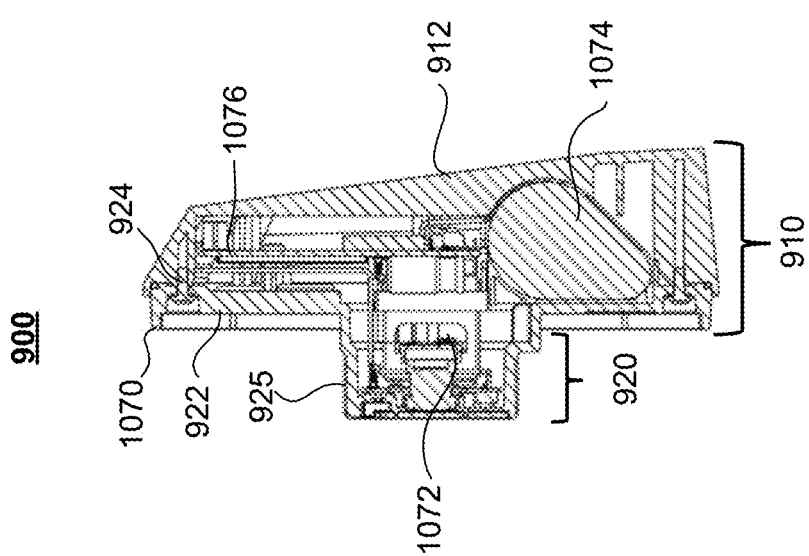

CARGO SENSORS, CARGO-SENSING UNITS, CARGO-SENSING SYSTEMS, AND METHODS OF USING THE SAME

CROSS-REFERENCE TO RELATED APPLICATIONS

The present application is a continuation in part of U.S. patent application Ser. No. 16/145,594 filed Sep. 28, 2018, the entire disclosure of which is incorporated herein by reference as if completely set forth below.

TECHNICAL FIELD

Aspects of the present disclosure relate generally to asset management, and more specifically to cargo sensors, cargo-sensing units, cargo-sensing systems, and methods of using the same.

BACKGROUND

In the related art, traditional cargo sensors utilize one or more ultrasonic sensors to detect the presence/absence of cargo when comparing the signature of an empty container to the signature obtained when cargo is present. An alternative related art approach is to utilize a camera to determine whether any cargo is loaded into a container. However, neither a single sound-based sensor nor related art approaches using images suggest estimating an amount of cargo in a container. Moreover, in the related art, sensors are often positioned at a container's 'nose' (e.g., backside, as opposed to a door-side). Yet, by virtue of this positioning, any camera or ultrasonic sensor is quickly blocked by cargo that is loaded first against the backside.

Many related art cargo sensors have been designed to observe cargo frequently, (e.g., based on time-varied sampling). Frequent sampling increases power consumption and waste. Further, time-varied sampling can cause latency problems (e.g., the time between the cargo change until the next cargo sample time may be too long). Furthermore, many related art cargo sensors lack multiple types of sensors, which, when combined, may provide exponential benefits.

Thus, there is a need for systems and methods for overcoming the deficiencies of the conventional manner for cargo sensors and cargo-sensing units that provides effective alternatives without added installation complexity, and robust field performance for the life of the equipment.

SUMMARY

In some example embodiments, there is provided a cargo-sensing unit including: an image sensor; at least one processor; and a memory having stored thereon computer program code that, when executed by the processor, controls the at least one processor to: instruct the image sensor to capture an image of a cargo space within a cargo container; compare the captured image to a baseline image of an empty cargo container; and determine, based on the comparison between the captured image and the baseline image, a cargo space utilization estimate.

The computer program code may further control the at least one processor to: perform edge detection on captured image; and compare the edges detected in the captured image to edges within the baseline image to determine the cargo space utilization estimate.

Determining the cargo space utilization estimate may be based on comparing features of the cargo container detectable in the captured image to features of the cargo container detectable in the baseline image.

Determining the cargo space utilization estimate may be based on comparing the floor space utilization of the cargo container by analyzing a trapezoidal floor space of the cargo space in the captured image to a trapezoidal floor space of the cargo container in the baseline image.

The computer program code may further control the at least one processor to: compare the captured image to a previously captured image of the cargo container; and determine, based on the comparison between the captured image and the previously captured image, changes to a load within the cargo container.

The cargo-sensing unit may further include a transmitter. The computer program code may further control the at least one processor to transmit the cargo space utilization estimation to a remote device.

The cargo-sensing unit may further include a door sensor. The computer program code may further control the at least one processor to: determine, based on signals from the door sensor, whether a door of the cargo container has been opened and closed, and instruct the image sensor to capture the image of the cargo space in response to determining that the door has been opened or closed since a most recent image capture.

The cargo-sensing unit may further include a light sensor configured to output signals based on an amount of light within the cargo space. The computer program code may further control the at least one processor to determine whether the door of the cargo container has been opened further based on the output signals of the light sensor.

The door sensor may include at least one from among a magnetic sensor, a light sensor, an accelerometer, and a gyroscopic sensor. The accelerometer or gyroscopic sensor orientation may be indicative of a door state change. For example, instantaneous values of one or more of yaw, pitch, and roll of the accelerometer or gyroscopic sensor may indicate a door position (e.g., open or close) or movement (e.g., opening or closing).

The cargo-sensing unit may further include a pressure sensor configured to output signals based on an air pressure within the cargo space. The computer program code may further control the at least one processor to deactivate the image sensor in response to the output signals indicating an air pressure below a predetermined threshold.

The cargo-sensing unit may further include a sonar sensor configured to output signals based on a distance between the sonar sensor and a closest portion of cargo within the cargo container. The computer program code may further control the at least one processor to determine the cargo space utilization estimate further based on the output signals.

The cargo-sensing unit may further include one or more auxiliary sensors. The at least one processor may include a first processor configured to communicate with the one or more auxiliary sensors and to instruct the image sensor to capture the image and a second processor configured to compare the captured image to the baseline image. The first processor may have a lower power utilization than the second processor.

The cargo sensing unit may further include: one or more environmental sensors configured to monitor an interior of the cargo space; and a transmitter configured to be disposed outside of the interior of the cargo space and configured to communicate with secondary systems external to the cargo space.

The secondary systems external to the cargo space may be installed or located on the cargo container (or asset) or may be located remote from the cargo container (or asset).

The cargo sensing unit may further include a receiver configured to be disposed in the interior of the cargo space and configured to communicate with external sensors located in the interior of the cargo space.

According to some embodiments, there is provided an installation method of a cargo-sensing unit, the cargo-sensing unit comprising a cap and a substantially cylindrical stem, an image sensor being disposed at least partially within the stem and configured to capture an image from a distal end of the stem. The method may include: forming mounting opening through the cargo container; inserting the stem through the mounting opening such that the distal end of the stem is disposed proximal to an inside portion of a cargo portion of the cargo container; and attaching a mounting mechanism to the stem, the mounting portion being secured against the inside portion of the cargo portion.

The method may further include: forming a security opening proximal to the mounting opening; inserting a security screw into the mounting opening; and securing the security screw to the cap of the cargo-sensing unit.

The stem may include a threaded portion. The mounting mechanism may include a mounting nut. The securing may include rotating the mounting nut onto the threaded portion of the stem.

The securing may include tightening the mounting nut by rotating the cap portion of the cargo-sensing unit.

The method may further include: performing edge detection on captured image; and comparing the edges detected in the captured image to edges within the baseline image to determine the cargo space utilization estimate.

In some cases, a secondary alignment mechanism may be used to prevent rotation of the unit once installed.

According to some embodiments, there is provided a cargo-sensing method including: capturing, using at least one image sensor, a baseline image of an interior of a cargo container; determining, based on sensor data from one or more auxiliary sensors, to update a cargo space utilization estimate; capturing, using the at least one image sensor, a current image of the interior of the cargo container; comparing the captured image to the baseline image; and determining, based on the comparison between the captured image and the baseline image, the updated cargo space utilization estimate.

The sensor data may include data from a door. The data from the door sensor may be indicative of a door of the cargo container being opened and closed. The capturing the current image may be performed in response to determining that the door has been opened and closed since a most recent image capture.

The determining to update the cargo space utilization estimate, the capturing a current image, comparing, and determining the updated cargo space utilization estimate may be repeatedly performed. The method may further include halting the repeated performance in response to determining, based on sensor data from an air pressure sensor, that the cargo container is in air transit.

The determining the updated cargo space utilization estimate may be further based on sonar sensor signals indicative of a distance between the cargo-sensing unit and a closest portion of cargo within the cargo container.

Determining to update the cargo space utilization estimate may be performed by a first processor, comparing the captured image to the baseline image is performed by a second processor, and the first processor has a lower power utilization than the second processor.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4A illustrates a side view of an example cargo-sensing unit.

FIG. 4B illustrates a front view of an example cargo-sensing unit.

FIG. 4C illustrates a mounting nut and security screw of a cargo-sensing unit according to an example embodiment.

FIG. 7A illustrates a side view of an example cargo-sensing unit.

FIG. 7B illustrates a back view of an example cargo-sensing unit.

FIGS. 10A and 10B illustrate cutaway views of a cargo-sensing unit according to an example embodiment.

DETAILED DESCRIPTION

The present disclosure can be understood more readily by reference to the following detailed description of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. Some example embodiments of the disclosed technology will be described more fully hereinafter with reference to the accompanying drawings. The disclosed technology might be embodied in many different forms and should not be construed as limited to the example embodiments set forth herein.

The disclosed technology includes a cargo-sensing unit that can capture images of a cargo space with an image sensor and estimate a cargo usage-based thereon. In some cases, the cargo-sensing unit can include a variety of auxiliary sensors for triggering image capture, improving cargo usage estimation, and/or capturing additional information. In certain embodiments, the cargo-sensing unit will include a first, low-powered processor to interact with the auxiliary sensors, and a second, higher-powered processor to analyze the captured images. In other embodiments, the cargo-sensing unit can only include a single processor to interact with both the image sensor and the auxiliary sensors and to output data.

The disclosed technology also includes a cargo-sensing unit that has an easily installable form factor. In some embodiments, the low-power design permits the cargo sensor to operate for an extended field duration without an external power source or wire; this greatly simplifies installation. In some cases, to further simplify the installation, and to support both internal sensing and external communication at the same time, the cargo-sensing unit can include a cap containing one or more auxiliary sensors and power sources and a stem containing at least a portion of an image sensor and other auxiliary sensors. The stem can be inserted into an opening in a side of a cargo container and secured thereto, such that the cap remains outside the cargo container, while at least a portion of the stem is positioned within the cargo container. An installation of an example cargo-sensing unit is described below in more detail with reference to FIGS. 5 and 6A-6C.

Figure 1:
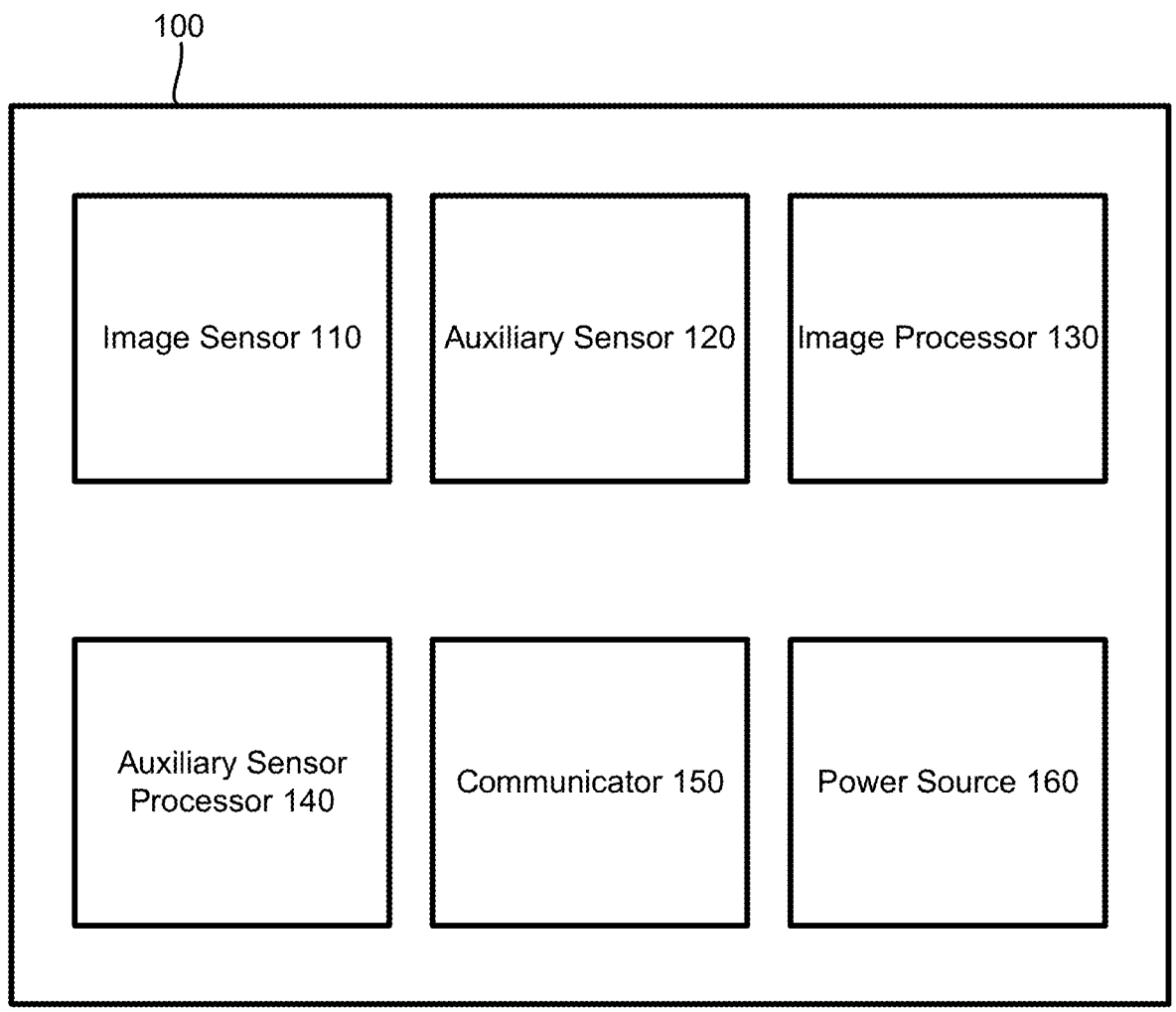
FIG. 1 is a block diagram of a cargo-sensing unit according to an example embodiment.

FIG. 1 illustrates a block diagram of a cargo-sensing unit 100 according to an example embodiment. The cargo-sensing unit 100 can include an image sensor 110, one or more auxiliary sensors 120, an image processor 130, an auxiliary sensor processor 140, a communicator 150, and a power source 160. The image sensor 110 can be embodied as various types of image capturing mechanisms (e.g., a digital camera and lens) as would be understood by one of ordinary skill. As a non-limiting example, the image sensor 110 can include a five-megapixel CCD or CMOS image sensor and an infrared flash unit. If greater resolution is desired, an image sensor with greater megapixel resolution can be appropriate. In some cases, the image sensor 110 can be configured to store images in a compressed format (e.g., JPEG) or in raw image format. In some instances, the image sensor 110 can capture and/or store images in black and white or greyscale. In some instances, the image sensor 110 can capture images within the infrared spectrum and/or the visible light spectrum. The one or more auxiliary sensors 120 can include, as non-limiting examples, an access sensor to detect potential access to the cargo area (e.g., one or more of a door sensor or magnetic door sensor, an accelerometer, or an ambient light sensor), a GPS receiver, a humidity sensor, a pressure sensor, a tamper sensor (e.g., a vibration/shock/impact sensor), and a distance sensor (e.g., an ultrasonic sensor or a laser sensor).

The image processor 130 can process image signals from the one or more auxiliary sensors 120. The auxiliary sensor processor 140 can process data from the image sensor 110. Meanwhile, the auxiliary sensor processor 140 can process the signals from the one or more auxiliary sensors 120, which can trigger image capturing by the image sensor 110. Those of skill in the art will recognize that, in certain embodiments, the image sensor processor and the auxiliary sensor processor can be embodied in a single processor or in multiple processors and that the functions ascribed to each processor can be divided between various processors. However, by using a higher-powered processor for image processing, or other computationally demanding processes, and a lower-powered processor for routine processing, significant power savings can be realized that allow for a design that does not require an external power source.

For example, the one or more auxiliary sensors 120 can include a door sensor and the auxiliary sensor processor 140 can trigger the image sensor 110 to capture an image of the cargo container when the door sensor signals indicate that the door opens and/or closes. In some cases, the auxiliary sensor processor 140 can process the signals from the one or more auxiliary sensors 120 to determine that image capturing is not necessary. For example, if data from an air pressure sensor indicates that the cargo container has been loaded onto an aircraft (e.g., the air pressure drops low enough to indicate that the cargo container is flying in an aircraft) image capturing and/or other sensor data capturing can be automatically deactivated. The image processor 130 can be a higher-powered processer than the auxiliary sensor processor 140 as image processing can be computationally expensive. Accordingly, the cargo-sensing unit 100 can preserve power.

The communicator 150 can communicate with one or more external systems. The communicator 150 can be configured to perform one or more types of wireless communication, for example direct, short-range communication (e.g., BLE to an in-cab or on-yard device), long-range communication protocols (e.g., cellular satellite and/or Wi-Fi communication), or indirect communication (e.g., to an on-container device, and then then through the on-container device to another system, or via Bluetooth to a cellular connected device). In some case, the communicator 150 can communicate image data from the image processor 130 and/or sensor data from the auxiliary sensor processor 140. In some circumstances, the communicator can only transmit a result of the image processing or auxiliary sensor processing. The communicator 150 can include a transmitter, a receiver, or a transceiver for interacting with one or more local or remote systems.

As non-limiting examples, the communicator can transmit one or more of: an indication of a door opening or closing (e.g., from a magnetic door sensor or accelerometer); light level; humidity level; pressure (e.g., air pressure) level in container; temperature in container; and location.

Power source 160 provides power to the various other components of the cargo-sensing unit 100. The power source 160 can include one or more of an energy harvesting device, such as a solar panel or a kinetic energy harvesting device, a substantially non-degrading power source (e.g., a plurality of supercapacitors, such as electric double-layer capacitors), and one or more batteries. In some cases, the power source can include a plurality of differentiable power sources, and can prioritize certain sources as a supplying power source (i.e., which of the power sources is providing power to the components of the cargo-sensing unit 100). For example, an energy harvesting device can be a preferred power source, followed by charged substantially non-degrading power sources, followed by one or more batteries (e.g., rechargeable or one-time-use batteries).

Figure 2:
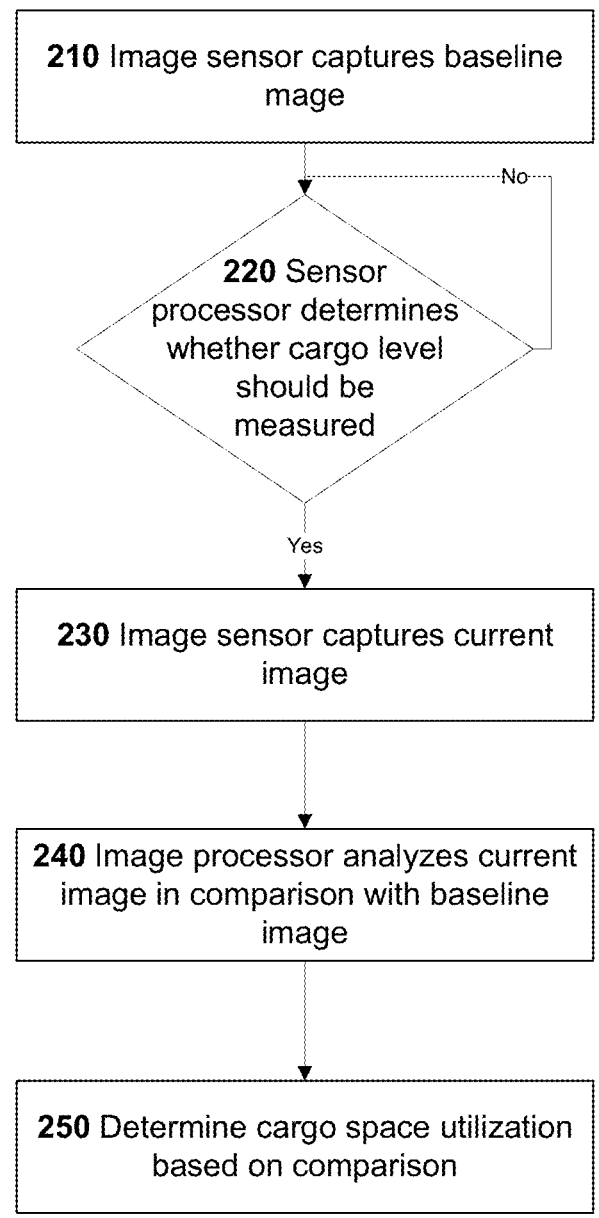
FIG. 2 is a flowchart illustrating a cargo-sensing method according to an example embodiment.

FIG. 2 is a flowchart illustrating a cargo-sensing method 200 according to an example embodiment. At 210, the image sensor 110 captures a baseline image of a cargo container (e.g., an image of the container when empty). At 220, auxiliary sensor processor 140 determines whether sensor data from the one or more auxiliary sensors 120 indicates that a current picture should be taken. If a current picture should be taken (220—Yes), at 230 the image sensor 110 captures a current image of the cargo container (e.g., an image of the cargo container with or without cargo).

As non-limiting examples, the auxiliary sensor processor 140 can determine that a current picture should be taken if the sensor data indicates that a door has been opened (e.g., a magnetic sensor and/or illumination sensor indicates that the door has been opened, or an accelerometer determines that the door has changed from vertical to horizontal orientation), the cargo container has reached a certain position (e.g., as determined by a GPS sensor), or the cargo container has been stopped for a pre-determined period of time (e.g., based on data from an accelerometer).

In some circumstances, sensor data from a plurality of auxiliary sensors of the one or more auxiliary sensors 120 can be used to determine that a picture should be taken. For example, magnetic door sensors (e.g., implemented using one or more Reed switches) can experience long-term reliability issues. As the door sensor and a magnetic housing move over time (e.g., through damage to doors) the sensor can become susceptible to false detection of the door opening and closing. Accordingly, door sensor data (e.g., magnetic door sensor data), light-level sensor data, accelerometer data, and/or orientation sensor (e.g., gyroscope) data can be combined to improve sensor accuracy and provide fault-tolerance. Light-level sensor data can be used to detect a rapid change in light levels (e.g., when swing doors are opened), and accelerometer data can indicate a horizontal motion event (often ending in a small impact) of the doors closing. For a 'roll door', accelerometer and/or orientation sensor data can be used to detecting based on the change of the accelerometer sensor orientation from vertical (i.e., when door is closed) to horizontal (i.e., when door is open).

For example, instantaneous values of one or more of yaw, pitch, and roll of the accelerometer or gyroscopic sensor can indicate a door position (e.g., open or close) or movement (e.g., opening or closing). However, in traditional applications of orientation, relying on the values of yaw, pitch, and roll requires near-constant monitoring in order to be utilized effectively. However, in a cargo sensor, high-frequency sampling consumes too much power. Thus, in an embodiment, sampling the accelerometer/gyroscopic sensor for yaw, pitch, and roll is activated only when the cargo container (e.g., the vehicle carrying the cargo container) is substantially stationary. In an embodiment, a low sampling rate can be reduced, with threshold triggers (e.g., large enough movements) can cause an ad hoc sampling or a temporary increase in the sampling rate. Accordingly, the operation of the cargo sensor and its battery life can be increased.

As another example, a magnetic sensor can be attached between a locking rod and the door. As the locking rod is moved from a locked position (i.e., securing the door closed) in order to open the cargo container, the movement of the locking rod triggers the cargo-sensing unit 100 to capture an image of the cargo-container prior to the door opening. Similarly, when the locking rod is secured (e.g., when the door is securely closed), the securing of the locking rod can trigger cargo-sensing unit 100 to capture an image of the cargo-container.

Additionally, in some cases, the relative position of a tracking unit to the cargo-sensing unit 100 can serve as an image-capture trigger. For example, both cargo-sensing unit 100 and the tracking unit can include a magnetometer. A baseline relative positioning of cargo-sensing unit 100 and the tracking unit can be determined (e.g., when originally secured, or upon loading of the cargo container), for example, using gyroscopic sensors and/or magnetometers. To determine the baseline relative positioning, When the relative positions change beyond a predetermined threshold, it can be determined that the cargo-sensing unit 100 and/or tracking unit have moved, triggering capturing of the cargo image.

At 240 the image processor 130 analyzes the current image in comparison with the baseline image and, at 250, determines a current cargo space utilization estimation (e.g., a percentage of cargo in the cargo container). A more detailed description of the image comparison is described below with reference to FIG. 3.

Figure 3:
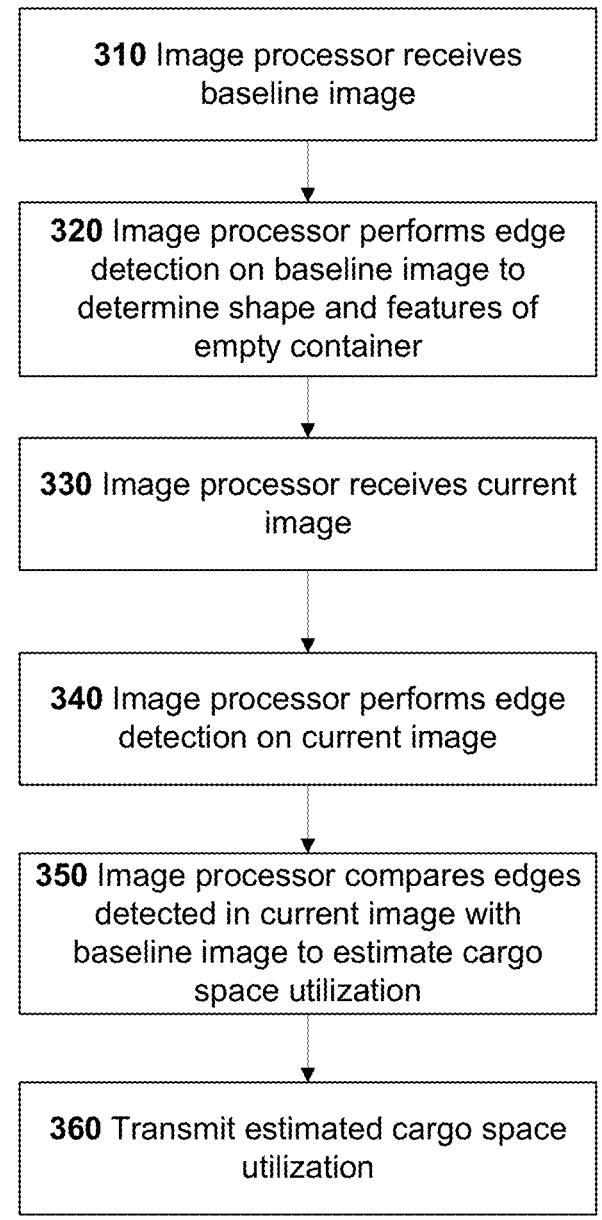
FIG. 3 is a flowchart of image analysis for cargo-sensing according to an example embodiment.

FIG. 3 is a flowchart of image analysis for cargo-sensing 300 according to an example embodiment. At 310, the image processor 130 receives the baseline image of the empty container. At 320, the image processor 130 performs edge detection on the baseline image. Using edge detection, the image processor 130 can determine a shape of the empty container including certain features of the empty container. For example, the edge detection can detect one or more of corrugated walls or ceilings, floorboards, and structural beams of the cargo container. Alternatively, the edge detection can identify a trapezoidal outline and appearance of the floor space of the empty container. At 330, the image processor 130 receives a current image of the cargo container. For example, the current image can be an image of the cargo container with some amount of cargo loaded therein. At 340, the image processor 130 uses edge detection on the current image.

At 350, the image processor 130 compares the edge detected current image with the edge detected baseline image to estimate an amount of cargo stored in the cargo container (e.g., a percentage of cargo space utilized). In some cases, the percentage can be based on a number or portion of features of the empty cargo container visible in the current image. For example, the percentage can be based on the percentage of the trapezoidal floor space that remains 'visible' when compared with the baseline image. In addition, the process can consider the nearest-most vertical plane where the cargo is loaded (e.g., a stack of cargo boxes), and analyze each percentage of that plane's edges which are obstructed by cargo. This provides further details on the way in which the cargo is stacked as well as information about the space available at the loading point of the container. For example, the left edge of the front-most vertical plane can indicate whether cargo is stacked to the top, the right edge can indicate how high cargo is stacked on the right wall of the cargo container, and the bottom edge can indicate that cargo is loaded only half-way across the cargo container. This information provides data about the balance of the load, and also indicates that the next cargo to load can be placed on the right side of the loading point. Moreover, even if the overall load percentage does not change, any changes in these edges can indicate a load 'shift'.

In some instances, information from an ultrasonic sensor can be used to in the percentage calculation. For example, the ultrasonic sensor can determine a distance between the ultrasonic sensor and a first cargo item (e.g., through echo-location). At 360, image processor 130 can control communicator 150 to transmit the determined estimated cargo space utilization. In some cases, the determined cargo percentage can be transmitted with indications of additional sensor data (e.g., time, location, status at current picture taking). In certain embodiments, the calculated percentage can only be transmitted if the percent full is materially (e.g., more than a predetermined threshold) different from a previous estimate. For example, in some cases, the calculated percentage would be transmitted if the percent full is greater than 5% different from a previous estimate. In some instances, a copy of the current image can be transmitted. In some cases, a GPS tag can be provided with the information.

In certain instances, a remote system can further analyze the image to determine a fill percentage. For example, accurate cargo-sensing for sealed containers, including '% full' description of the contents can be further enhanced using remote artificial intelligence processing. In some cases, weight sensor data (e.g., current weight of the cargo or changes in weight from the cargo) can be utilized in addition to the image processing to detect or verify changes to cargo utilization. For example, weight sensor data can help differentiate between cargo shifting and cargo removal. In an embodiment, incorporating contextual data (such as cargo weight and weight distribution, temperature, pressure, et cetera) with the image analysis aids in the quality of cargo recognition and/or state assessment.

In some embodiments, the image processor 130 compares the current image to a previous 'current' image (i.e., a most recent, non-baseline image). The comparison can indicate changes to the cargo. For example, if edges move between the images but the percent full is not materially different, a load shift can be detected, and a load shift alert can be transmitted using the communicator 150.

Although edge detection is described above, this is merely an example. In some cases, a classification algorithm can be utilized with and/or in addition to edge detection to refine load percentage determination, to better detect shifts, identify cargo load type, and determine cargo load quality. In an embodiment, the classification algorithm combines computer vision with deep learning. In an embodiment, the classification algorithms utilize deep neural networks. However, this is only an example, and, in an embodiment, the classification algorithms can use pattern classifiers such as Bayesian classifiers, various linear classifiers, k-nearest neighbor algorithms, and/or decision trees.

FIGS. 4A-4C illustrate a cargo-sensing unit 400 according to an example embodiment. The cargo-sensing unit 400 can include similar elements to those discussed above with reference to FIG. 1. In particular, in certain embodiments, the cargo-sensing unit 400 can include an image sensor 110, auxiliary sensors 120, an image processor 130, an auxiliary sensor processor 140, a communicator 150, and a power source 160. FIGS. 4A and 4B illustrate the cargo-sensing unit 400 as having an overall mushroom shape with a larger, substantially cylindrical cap 410 and a smaller cylindrical stem 420. When installed on a cargo container, the cap 410 can be disposed outside of a cargo area, while the stem 420 can protrude into the cargo area (see, e.g., FIGS. 6A-6C). By portions of the cargo-sensing unit 400 being disposed both inside and outside a container wall (e.g., 'peering through' the container wall), the cargo-sensing unit 400 can effectively communicate wirelessly with components outside the container (e.g., such as to another tracking system, over Wi-Fi/Cellular, or to a person whose phone is outside the container), as well as communicate wirelessly to separate wireless sensors inside the container (e.g., freight tracking beacons and sensors). Accordingly, cargo-sensing unit 400 can act as a relay and/or repeater between freight sensors (inside the container) and external systems (trackers, phones, etc.). For example, cargo-sensing unit 400 can communicate with pallet tracking sensors inside the container, and send data from the pallet-tracking sensors to an external tracking system via short-range or long-range communication components outside the container. Furthermore, cargo-sensing unit 400 can effectively sense environments both internal and external to the container (e.g. cargo/image, temperature, humidity, light, pressure, etc.).

The cap 410 can include the power source 160 (e.g., batteries and/or a solar panel), the image processor 130, the auxiliary sensor processor 140, the communicator 150 (e.g., an antenna, BLE module, or Wi-Fi module), and one or more auxiliary sensors 120 (e.g., magnetic door sensor, tamper sensor, GPS receiver). In some cases, the cap 410 can also include portions of the image sensor 110 (e.g., a CCD sensor). In some embodiments, the cap 410 can include a security image sensor 120 configured to capture images outside of a cargo container. For example, the security image sensor 120 can capture images of individuals attempting to interfere with the unit or open the cargo container. In some cases, the security image sensor 120 can be triggered to capture an image in response to signals from one or more other auxiliary sensors 120 (e.g., a motion sensor, a tamper sensor, or a door sensor).

The stem 420 can include one or more auxiliary sensors 120 (e.g., an ambient light sensor, a humidity sensor, a temperature sensor, an air pressure sensor, other environmental sensors) and one or more portions of the image sensor 110 (e.g., a lens and flash mechanism). Accordingly, the cargo-sensing unit 400 and various auxiliary sensors 120 can be positioned to detect data on the cargo container without significantly impeding a cargo space.

The stem 420 can have a threaded surface 425 that is configured to accommodate a mounting nut 440. In some cases, the cap 410 can include a security screw hole 415 and configured to receive a security screw 430. The security screw 430 provides a secondary point of attachment for securing the cargo sensing unit 400 to a cargo container. Thus, the cargo sensing unit 400 may not be removable by mere rotation. In some cases, the security screw 430 can integrate with a tamper sensor (e.g., through physical force or completing an electric circuit) such that the tamper sensor sends an alert signal when the security screw 430 is removed. In some embodiments, the cap can include a secondary alignment post, fitting into a second sealed hole in the container wall, which provides orientation stability for long-term photo consistency, but which cannot provide extra security functionality.

Figure 5:
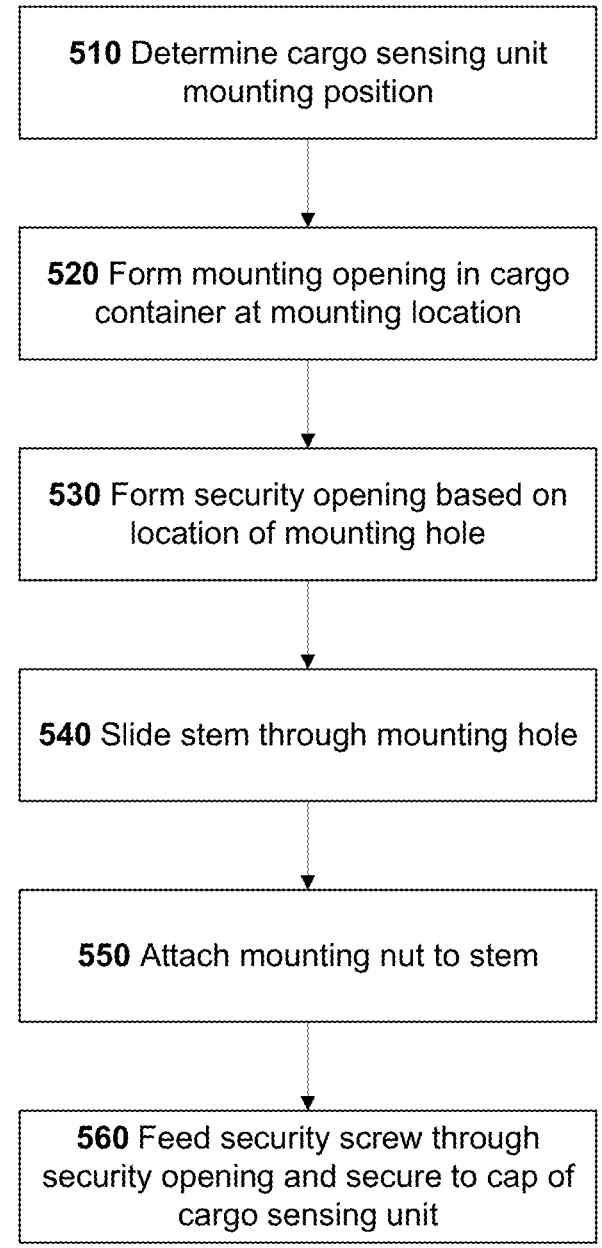
FIG. 5 is a flowchart of a method of installation of a cargo-sensing unit according to an example embodiment.

FIG. 5 is a flowchart 500 of a method of installation of a cargo-sensing unit 400 according to an example embodiment. At 510, an installer determines a mounting location of the cargo-sensing unit 400. For example, the mounting location can be a standard (e.g., proportional) height and position in a door of a cargo container (e.g., near middle). However, this is merely an example, and, in some cases, a mounting position can be determined as needed by circumstances.

At 520, the installer drills a circular mounting opening at the mounting location through the cargo container (e.g., through a door or wall of the cargo container). The circular opening should be large enough to receive the stem 420 of the cargo-sensing unit 400. In some cases, at 530, an additional security or alignment opening is drilled relative to the mounting opening. In some cases, the relative position of the security opening and mounting opening can be determined using a mounting template (e.g., a paper or plastic mounting template. The security opening should be large enough to accommodate a security screw.

At 540, the installer slides the stem 420 through the mounting opening, such that the cap 410 is outside of the cargo container and an end of the stem 420 is inside the cargo container. At 550, the installer attaches the mounting nut 440 to the stem 420. For example, the mounting nut 440 and stem 420 can be complementarily threaded, and the mounting nut can be rotated onto the stem 420. At 560, the installer feeds the security screw 430 through the security opening and tightens the security screw 430 into the security screw hole 415 of the cap 410. The installer tightens the mounting nut 440 and the security screw 430. The mounting nut 440 and security screw 430 can be installed from inside the cargo container or from an inside portion of the cargo container door. One of ordinary skill will understand that the installer can include one or more individuals and/or tools.

Figures 6A, 6B, 6C:
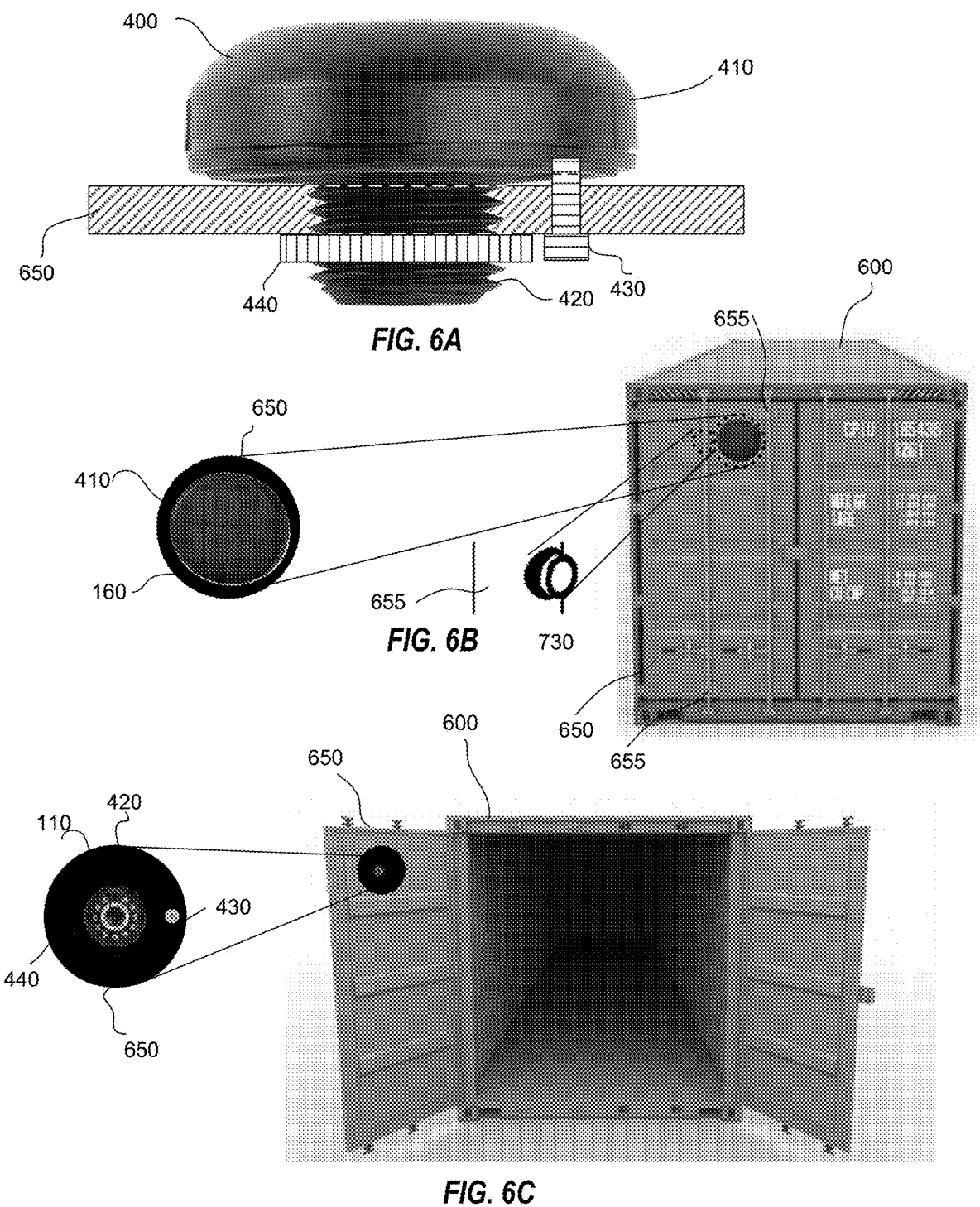
FIGS. 6A-6C illustrate a cargo-sensing unit installed in a cargo container according to an example embodiment.

FIGS. 6A-6C illustrate a cargo-sensing unit 400 installed in a cargo container 600 according to an example embodiment. In FIGS. 6A-6C the cargo-sensing unit 400 is installed in a door 650 of the cargo container 600, but this is merely an example. FIG. 6A illustrates a cutaway view of the cargo-sensing unit 400 installed in the door 650. The cap 410 of the cargo-sensing unit 400 is disposed on one side of the door 650. The stem 420 extends through the door 650, and the cargo-sensing unit 400 is secured to the door with mounting nut 440 and security screw 430.

FIG. 6B illustrates the cap 410 of the installed cargo-sensing unit 400 disposed on an outside portion of the door 650. The cap has a solar panel (e.g., power source 160) installed in its back surface. A magnet trigger 730 can be installed on a locking bar 655 substantially adjacent to cargo-sensing unit 400. When the locking bar 655 is rotated (i.e., indicating that the cargo door 650 is being opened), the magnet trigger 730 can activate a reed switch within cargo-sensing unit 400, signaling cargo-sensing unit 400 to capture images. Example embodiments of magnet trigger 730 are disclosed below in greater detail with reference to FIGS. 14-16. FIG. 6C illustrates the stem 420 of the installed cargo-sensing unit 400 protruding through an inside portion of the door 650. The stem includes the image sensor 110 embedded in a front portion thereof. The mounting nut 440 and the security screw 430 secure the cargo-sensing unit 400 to the door 650 of the cargo container 600.

FIGS. 7A and 7B illustrate a cargo-sensing unit 700 according to another example embodiment. The cargo-sensing unit 700 can include similar elements to those discussed above with reference to FIGS. 1 and 4A-4C. In particular, in certain embodiments, the cargo-sensing unit 700 can include an image sensor 110, auxiliary sensors 120, an image processor 130, an auxiliary sensor processor 140, a communicator 150, and a power source 160. FIGS. 7A and 7B illustrate the cargo-sensing unit 700 as having a cap 710 and a smaller cylindrical stem 720. The stem 720 can have a threaded surface 725 that is configured to accommodate a mounting nut. The cap 710 and stem 720 can be substantially similar to those discussed above with reference to FIGS. 4A-4C. The cap 710 can include an indicator 740 indicating a state of cargo-sensing unit 700. In some cases, the indicator 740 can indicate one or more of a power state (e.g., on or off), an activity state (e.g., sensing, hibernating, stand-by, processing, transmitting, or receiving), and a stress state (e.g., low battery or change of cargo utilization). The indicator 740 can be a visual indicator, and indicator 740 can indicate the state of cargo-sensing unit 700 through color and/or flashing of a light. A magnet housing 730 separate from a main body of cargo-sensing unit 700 is illustrated. Magnet housing 730 can be attached to, for example, a locking bar adjacent to an installed position of cargo-sensing unit 700. When magnet housing 730 is moved (e.g., when the locking bar is rotated to open a cargo door), the movement of the magnet triggers a reed switch within cargo-sensing unit 700. Cargo-sensing unit 700 can then operate to capture cargo data (e.g., images, environmental information) in accordance with the door opening and closing.

Figure 8B:
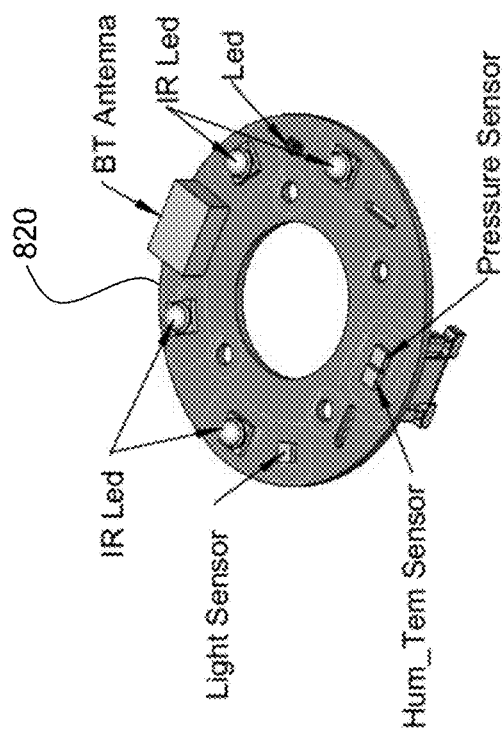
FIG. 8B illustrates an example stem board.
Figure 8A:
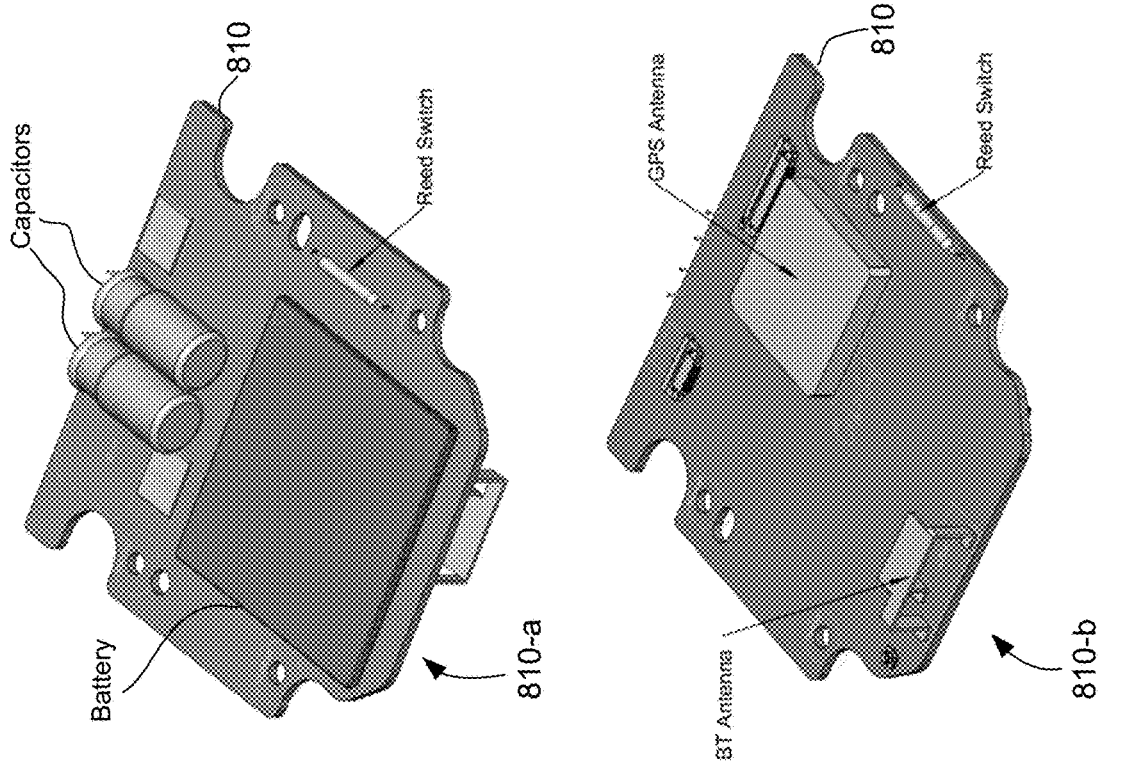
FIG. 8A illustrates an example cap board.
Figure 9A:
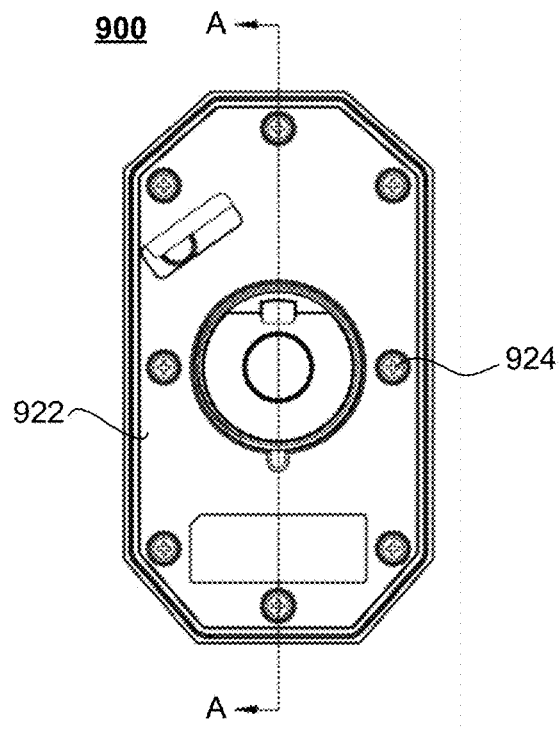
FIGS. 9A-9D illustrate a cargo-sensing unit according to an example embodiment.
Figure 9B:
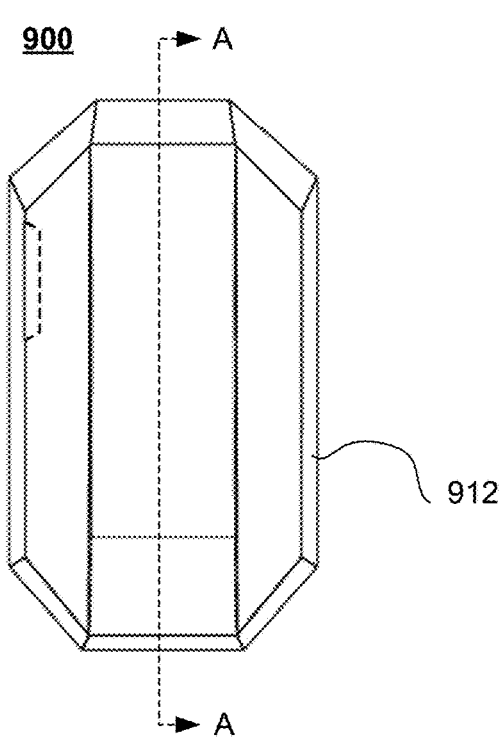
Figure 9C:
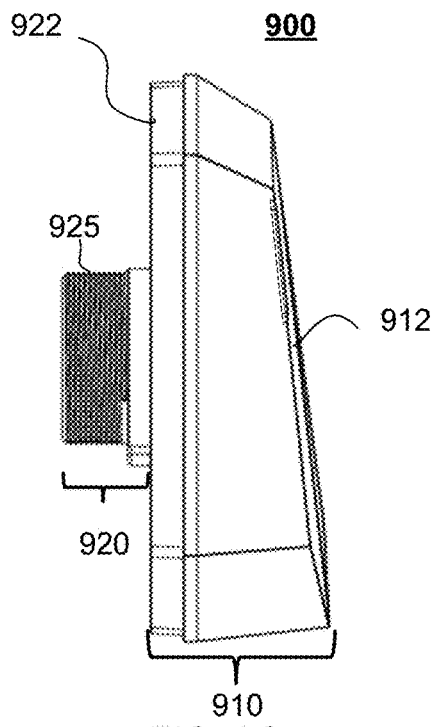
Figure 9D:
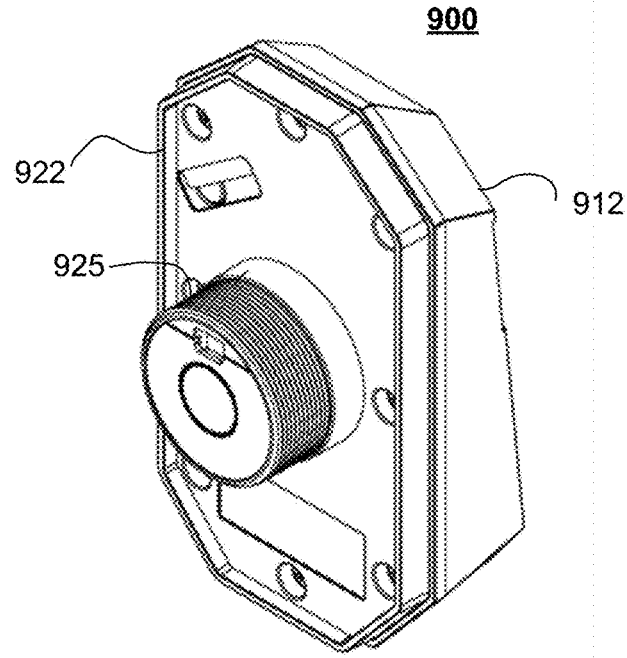

FIG. 8A illustrates front 810-a and back 810-b sides of an example cap board 810. Cap board 810 can be included within a cap (e.g., 410 or 810) of a cargo-sensing unit (e.g., cargo-sensing unit 400 or 800). As illustrated in FIG. 8A, cap board 810 can include a GPS antenna (e.g., to determine an approximate location of the cargo-sensing unit), a Bluetooth (BT) antenna (e.g., to communicate with external systems), one or more reed switches (e.g., to implement a magnetic door sensor), and a battery and one or more capacitors (e.g., to power the various components of the cargo-sensing unit). One of ordinary skill will recognize that these are merely examples, and various additional or alternative components can be included within a cap board 810.

FIG. 8B illustrates an example stem board 820. Stem board 820 can be included within a stem (e.g., 420 or 820) of a cargo-sensing unit (e.g., cargo-sensing unit 400 or 800). As illustrated in FIG. 8B, stem board 820 can include a BT antenna (e.g., to communicate with sensors internal to the cargo space), a humidity and/or temperature sensor (Hum_Tem Sensor) (e.g., to sense humidity and temperature within a cargo space), a pressure sensor (e.g., to sense an air pressure within a cargo space), a light sensor (e.g., to detect light within a cargo space), one or more LEDs (e.g., to provide light or an indicator within the cargo space), and one or more infrared (IR) LEDs (e.g., to provide IR light into the cargo space). The various components of the stem board 820 can be powered by (for example), the battery and capacitors of the cap board 810. One of ordinary skill will recognize that these are merely examples, and various additional or alternative components can be included within a stem board 820.

FIGS. 9A-9D illustrate a cargo-sensing unit 900 according to another example embodiment. The cargo-sensing unit 900 can include similar elements to those discussed above with reference to FIGS. 1, 4A-4C, and 7A-7B. In particular, in certain embodiments, the cargo-sensing unit 900 can include one or more of an image sensor 110, auxiliary sensors 120, an image processor 130, an auxiliary sensor processor 140, a communicator 150, and a power source 160. FIGS. 9A-9D illustrate the cargo-sensing unit 900 as having a cap 910 and a smaller cylindrical stem 920. The stem 920 can have a threaded surface 925 that is configured to accommodate a mounting nut. The cap 910 and stem 920 can be substantially similar to those discussed above with reference to FIGS. 4A-4C. The cap 910 can include an enclosure top 912 with includes a plurality of slanted surfaces. The stem 920 can extend from an enclosure bottom 922. One or more enclosure screws 924 can secure the enclosure bottom 922 to the enclosure top 912.

FIGS. 10A and 10B illustrate cutaway views of a cargo-sensing unit 900 according to an example embodiment. The cargo-sensing unit 900 can include similar elements to those discussed above with reference to FIGS. 1, 4A-4C, 7A-7B, and 9A-9D. In particular, in certain embodiments, the cargo-sensing unit 900 can include one or more of an image sensor 110, auxiliary sensors 120, an image processor 130, an auxiliary sensor processor 140, a communicator 150, a power source 160, an enclosure top 912, an enclosure bottom 922, and one or more enclosure screws 924. FIGS. 10A and 10B illustrate a cutaway view of a cargo-sensing unit 900 at line A illustrated in FIGS. 9A and 9B. FIG. 10B illustrates a cargo-sensing unit 900 installed on a cargo door 650.

Referring to FIGS. 10A and 10B, cargo-sensing unit 900 includes a stem 920 with a threaded surface 925 that is configured to accommodate a mounting nut 1062. A first washer 1064 (e.g., a flat washer) and a sealing washer 1066 separates and can electromechanically isolate nut 1062—and entire unit body—from the cargo door 650. Exterior sealer 1068 separates and can also electromechanically isolate the enclosure bottom 922 from the cargo door 650. An install stiffener rib 1070 provides resistance to stiffen an installation position of the cargo-sensing unit 900 and prevents narrowing the gap between the enclosure bottom 922 and the cargo door surface. Lens assembly 1072 is maintained within stem 920. Battery 1074 and PCBA 1076 are maintained within enclosure top 912. PCBA 1076 can include one or more elements of cap board 810 illustrated in FIG. 8A.

Figure 11:
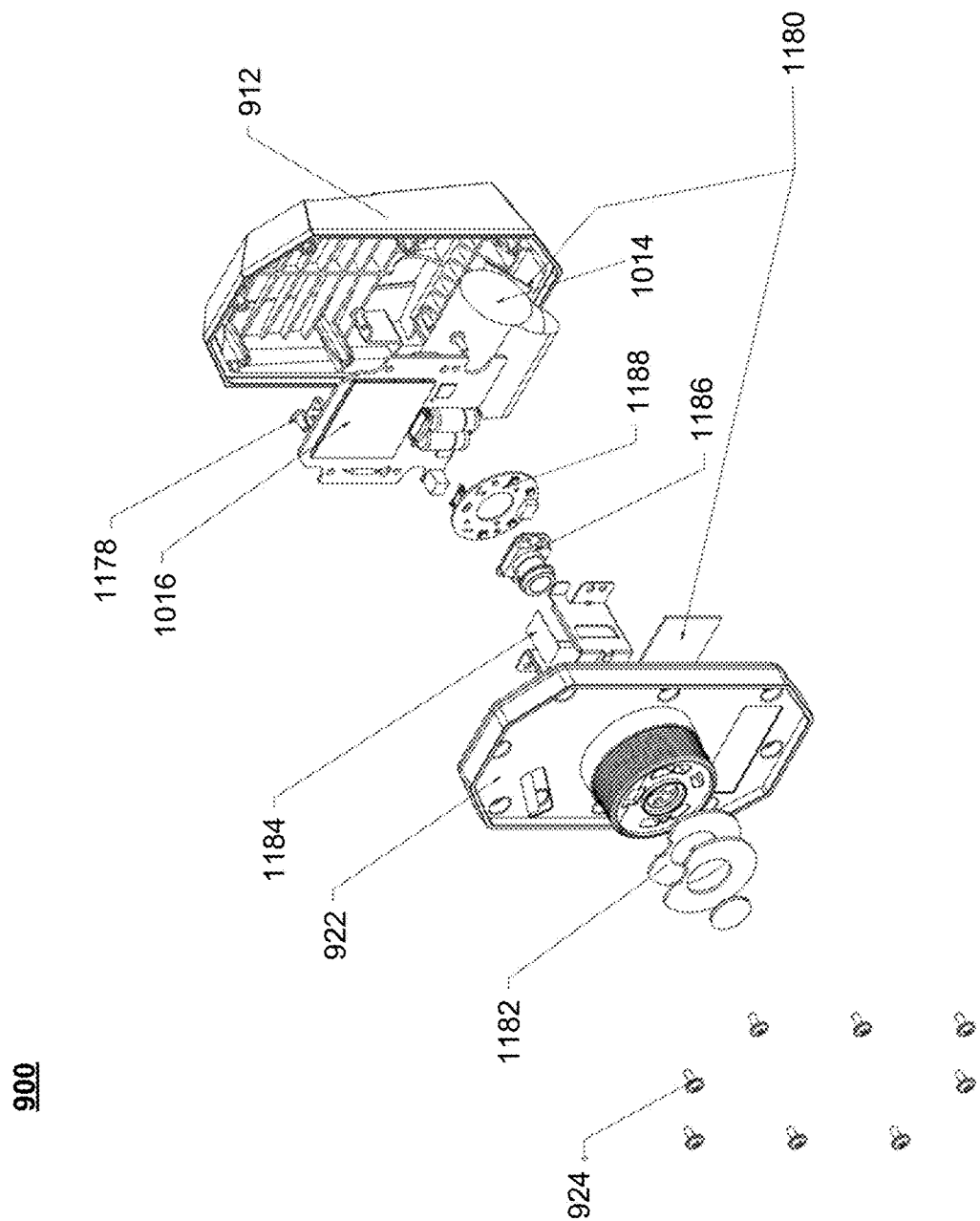
FIG. 11 illustrates an exploded view of a cargo-sensing unit according to an example embodiment.

FIG. 11 illustrates an exploded view of a cargo-sensing unit 900 according to an example embodiment. The cargo-sensing unit 900 can include similar elements to those discussed above with reference to FIGS. 1, 4A-4C, 7A-7B, 9A-9D, and 10A-10B. For example, in certain embodiments, the cargo-sensing unit 900 can include one or more of an image sensor 110, auxiliary sensors 120, an image processor 130, an auxiliary sensor processor 140, a communicator 150, and a power source 160. FIG. 11 illustrates a cargo-sensing unit 900 including enclosure top 912, enclosure bottom 922, one or more enclosure screws 924, battery 1074, and PCBA board 1076. PCBA board 1076 can be mounted to enclosure top 912 with mounting screws 1178. Battery cushions 1180 can secure battery 1014 within enclosure top 912 and dampen impacts to battery 1014. Cargo-sensing unit 900 also includes a lens assembly 1072, which includes a lens glass assembly 1182, a lens bracket assembly 1184, a camera unit 1186, and a sensor/flash PCB 1188. Sensor/flash PCB 1188 can include one or more elements of stem board 820 illustrated in FIG. 8B.

Figure 12:
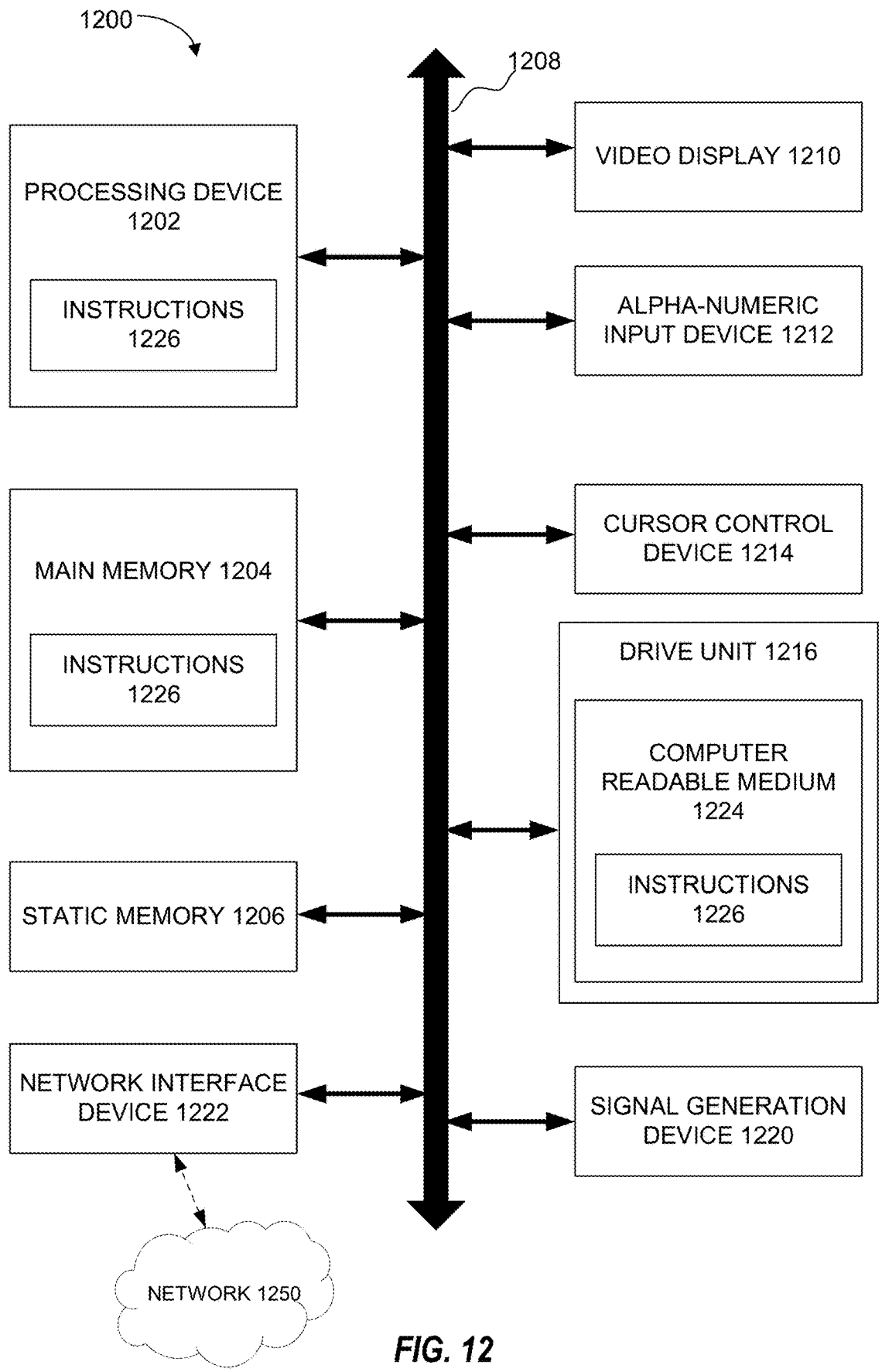
FIG. 12 is a block diagram of an example computer system that can implement certain aspects of the present disclosure.

FIG. 12 is a block diagram of example computer system 1200 that can implement certain aspects of the present disclosure. The computer system 1200 can include a set of instructions 1226 for controlling operation of the computer system 1200. In some implementations, the computer system 1200 can be connected (e.g., networked) to other machines in a Local Area Network (LAN), an intranet, an extranet, a satellite communications system, or the Internet. The computer system 1200 can operate in the capacity of a server or a client machine in a client-server network environment, or as a peer machine in a peer-to-peer (or distributed) network environment. The computer system 1200 can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 1200 is illustrated, the term "machine" shall also be taken to include any collection of machines (e.g., computers) that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random-access memory (DRAM) such as synchronous DRAM (SDRAM), etc.), a static memory 1206 (e.g., flash memory, static random-access memory (SRAM), etc.), and a secondary memory 1216 (e.g., a data storage device), which communicate with each other via a bus 1208.

The processing device 1202 represents one or more general-purpose processing devices such as a microprocessor, a microcontroller, a central processing unit, or the like. As non-limiting examples, the processing device 1202 can be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 1202 can also be one or more special-purpose processing devices such as an application-specific integrated circuit (ASIC), a field-programmable gate array (FPGA), a digital signal processor (DSP), network processor, or the like. The processing device 1202 is configured to execute the operations for electronically creating and trading derivative products based on one or more indices relating to volatility.

The computer system 1200 can further include a network interface device 1222, which is connectable to a network 1250. The computer system 1200 also can include a video display unit 1210, i.e., a display (e.g., a liquid crystal display (LCD), a touch screen, or a cathode ray tube (CRT)), an alphanumeric input device 1212 (e.g., a keyboard), a cursor control device 1214 (e.g., a mouse), and a signal generation device 1220 (e.g., a speaker).

The secondary memory 1216 can include a non-transitory storage medium 1224 on which is stored one or more sets of instructions 1226 for the computer system 1200 representing any one or more of the methodologies or functions described herein. For example, the instructions 1226 can include instructions for implementing an asset tracking device including a power source and power management system or subsystem for a container or a trailer. The instructions 1226 for the computer system 1200 can also reside, completely or at least partially, within the main memory 1204 and/or within the processing device 1202 during execution thereof by the computer system 1200, the main memory 1204 and the processing device 1202 also constituting computer-readable storage media.

While the storage medium 1224 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

As would be understood by one of ordinary skill, according to some embodiments, one or more elements of the computer system 1200 can be included in the cargo-sensing unit 100 to embody the image processor 130 and/or the auxiliary sensor processor 140.

Figure 13:
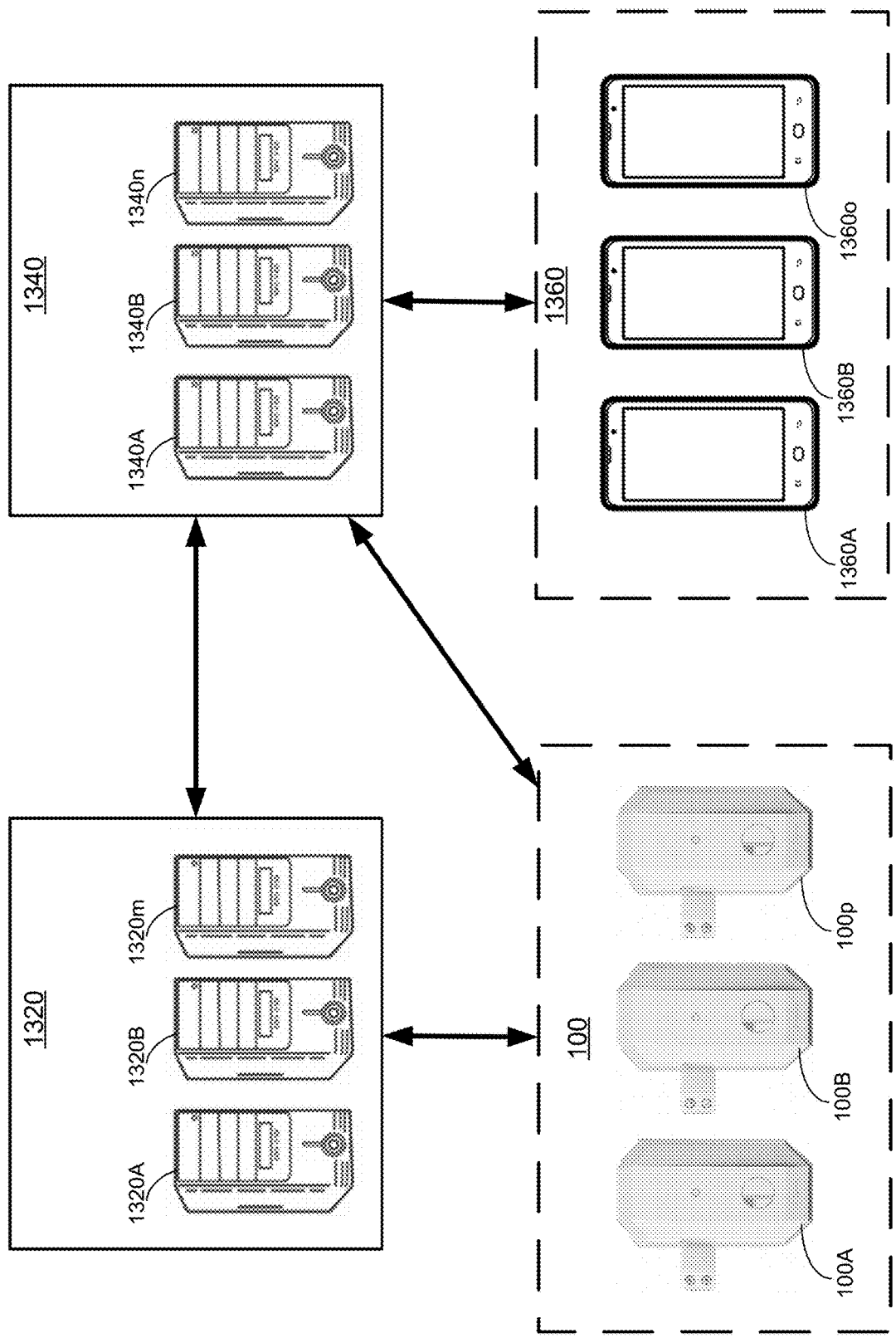
FIG. 13 is a block diagram of an example environment for implementing certain aspects of the present disclosure.

FIG. 13 illustrates an example environment 1300 in which aspects of the present disclosure can be implemented. Environment 1300 includes one or more cargo-sensing units 100, one or more modeling servers 1320, one or more control servers 1340, and one or more user devices 1360. One of ordinary skill will recognize that one or more elements of the computer system 1200 can be used to implement the one or more modeling servers 1320, one or more control servers 1340, and one or more user devices 1360.

Cargo-sensing units 100, modeling servers 1320, control servers 1340, and/or user devices 1360 can be connected to each other directly or through one or more networks. For example, communicator 150 of cargo-sensing unit 100 can communicate with the modeling servers 1320 over the network to transmit images for state analysis. In some cases, communicator 150 of cargo-sensing unit 100 can communicate with the control servers 1340 over the network to transmit state information, such as an indication of a door opening or closing (e.g., from a magnetic door sensor or accelerometer); light level; humidity level; pressure (e.g., air pressure) level in container; temperature in container; and location.

Modeling server 1320 can analyze images received from cargo-sensing unit 100 to determine a status of the cargo, such as full state, shift-detection, load quality, and load type. Modeling server 1320 can implement one or more machine-learning algorithms or neural networks to analyze the images. As a non-limiting example, modeling server 1320 can implement classification algorithms to classify the images in accordance with one or more of: cargo type, cargo-load quality, cargo volume, and/or detection of various anomalies (as discussed below in greater detail). Using object detection, modeling server 1320 can compare a series of images of a same cargo container to detect changes within the cargo area (e.g., cargo-shift).

In some cases, the modeling server 1320 can determine poor loading by retroactively examining detected shifts. For example, if a shift is detected in image A+1, modeling server 1320 can determine that image A depicts a poorly loaded cargo container (i.e., one where a shift is more likely to occur). Accordingly, if a future cargo container load has substantially similarity to the cargo load container of image A, modeling server 1320 can determine that the future cargo container is poorly loaded.

In an embodiment, modeling server 1320 can be configured to detect anomalies within a cargo volume. For example, modeling server 1320 can detect the presence of loading/unloading equipment within a cargo area (e.g., after a door closes), and alert an operator (e.g., driver or a central controller) of the presence of such equipment. Accordingly, equipment accidentally left in a cargo container after loading can be quickly identified and returned. As another example, modeling server 1320 can detect the presence of persons and/or animals within a cargo container. The presence of such persons can be automatically reported, for example, to a driver, a central controller, a guard station, and/or customs agents, in order to limit the possibility of espionage or unknown stowaways.

In an embodiment, modeling server 1320 can determine unloading requirements. For instance, based on a time of cargo (e.g., pallets, boxes), a load percentage (e.g., 60% full), and load quality (e.g., unlikely to shift or easy to remove from cargo), modeling server 1320 can determine required equipment (e.g., forklifts, pallet jacks, etc.), cargo space requirements, and/or manpower needed to effectively unload the cargo. In some cases, the determined unloading requirements can be additionally based on external factors, such as maximum unloading-time or cargo-sensitivity. For example, a single worker utilizing a forklift can be able to effectively unload a cargo container in 30 minutes. However, if the cargo-container must be removed in 20 minutes, modeling server 1320 can determine that two workers and two forklifts are required.

In some cases, modeling server 1320 can generate a classification model based on an analysis of cargo images (e.g., tagged cargo images). Modeling server 1320 can transmit the classification model to cargo-sensing unit 100, and one of the processors of cargo-sensing unit 100 can analyze captured images based on the classification model. For example, cargo-sensing unit 100 can utilize a trained neural network to process captured cargo images and other sensor data in order to determine, for example, cargo state, cargo type, cargo-container conditions, shift detection, and the like. As would be understood by one of ordinary skill in light of the present disclosure, by such improvements, cargo sensor 100 can preserve power as analyzing the images and/or other sensor data and reporting a result can be less intensive than transmitting the raw images and sensor data. In some cases, cargo sensor 100 can perform a first-level classification (e.g., to determine whether the cargo has changed since a last image, and/or loaded/unloaded status), and modeling server 1320 can further analyze those images to determine, for example, a type of cargo, percentage loaded, loaded quality, and unloading requirements.

Control server 1340 (e.g., cargo-sensor controlling server) can control the operation of cargo-sensing unit 100. For example, control server 1340 can transmit instructions to cargo-sensing unit 100 (e.g., through communicator 150) to capture images and/or environmental information. In some cases, control server 1340 can operate a schedule, and control cargo-sensing unit 100 to capture cargo images according to the schedule (e.g., hourly, daily, every-five minutes). Control server 1340 can transmit a schedule to cargo-sensing unit 100, and cargo-sensing unit 100 can capture images in accordance with the schedule. In some cases, control server 1340 can transmit ad-hoc image and/or environmental capture requests. For example, control server 1340 can determine that the cargo container is in a certain state (e.g., end-of-drive (EOD), beginning-of-drive (BOD), door open/closed, shock, cargo shift), and control the cargo-sensing unit 100 to capture an image. Control server 1340 can determine the state based on sensor data received from cargo-sensing unit 100 and/or external notifications, such as check-in information from a driver. In an embodiment, control server 1340 can modify detection and/or reporting logic of the cargo-sensing unit 100 such that cargo-sensing unit 100 can determine (e.g., based on its own sensor data and/or external notification) a given state of the cargo container and actions to take. In some instances, control server 1340 can control cargo-sensing unit 100 to capture an image within a minimal time interval, or can configure cargo-sensing unit 100 to capture images within a minimal time interval. For example, if an image has not been captured due to a change in the state within the past four hours, control-server 1340 can instruct cargo-sensing unit 100 to capture another image, or cargo-sensing unit 100 can be configured to capture an image at least once every four hours.

In some cases, one or more cargo sensors (e.g., impact sensors attached to cargo units and/or weight sensors detecting weight on the floor of the cargo units) can detect changes in cargo positioning, such as a cargo shift (e.g., through an impact indicating a fall or by changes in the weight distribution within the cargo container). In such cases, cargo-sensing unit 100 can capture an image in response to the cargo shifting being detected (e.g., through a command from control server 1340).

In certain cases, control server 1340 can provide an interface (e.g., a web-interface) to communicate with user device 1360. As non-limiting examples, user device 1360 can be associated with an owner of the shipping container, an owner of the shipped contents, and/or a customer awaiting the cargo. User device 1360 can interface with control server 1340 to adjust the image capturing schedule or trigger ad-hoc image capturing (e.g., provide an input-interface for the user to trigger a near-immediate capture of a cargo image and/or other sensor data). In some cases, user device 1360 can designate specific conditions for triggering image capture. For example, user device 1360 can require image capture based on specific temperatures (e.g., for perishable goods), humidity levels, light-levels, travel speeds (e.g., too fast or slowing down), and locations.

The web-interface can provide user device 1360 with statuses (e.g., cargo contain status information) of specific cargo units and/or cargo holds. Specific users can be associated with specific units (e.g., cargo units or cargo-sensing units 100, for example, based on a shipping manifest). A user can validate into the web-interface (e.g., with log-in credentials) to access status and images from the associated cargo-sensing units to determine load status and/or view cargo images. In some cases, the cargo images presented can be a most recent cargo image (e.g., stored in control server 1340). However, this is merely an example and the user device 1360 can trigger a new cargo image to be taken by cargo-sensing unit 100 and transmitted to user device 1360.

As discussed above, in an embodiment, cargo-sensing unit 100 can analyze the captured images and/or sensor data. Accordingly, in a case where user device 1360 (e.g., through a web-interface) or control server 1340 triggers image/sensor capture, cargo-sensing unit 100 can analyze such captured images and report a result to the triggering device. Furthermore, in an embodiment, cargo-sensing unit 100 can detect events within the image/sensor data, such as a cargo shift, a high impact to the sensor and/or cargo container, or sudden or great pressure/temperature change within the cargo container. When such an event is detected by cargo-sensing unit 100, cargo-sensing unit 100 can send an alert to a monitoring device/user. For example, cargo-sensing unit 100 can send an alert to control server 1340 or an application operating on user device 1360, output an email or a text message to one or more designated users, or otherwise output a notification of the detected event. The notification can be an indication of the triggered event either alone or with one or more captured images and/or sensor data.

Figure 14:
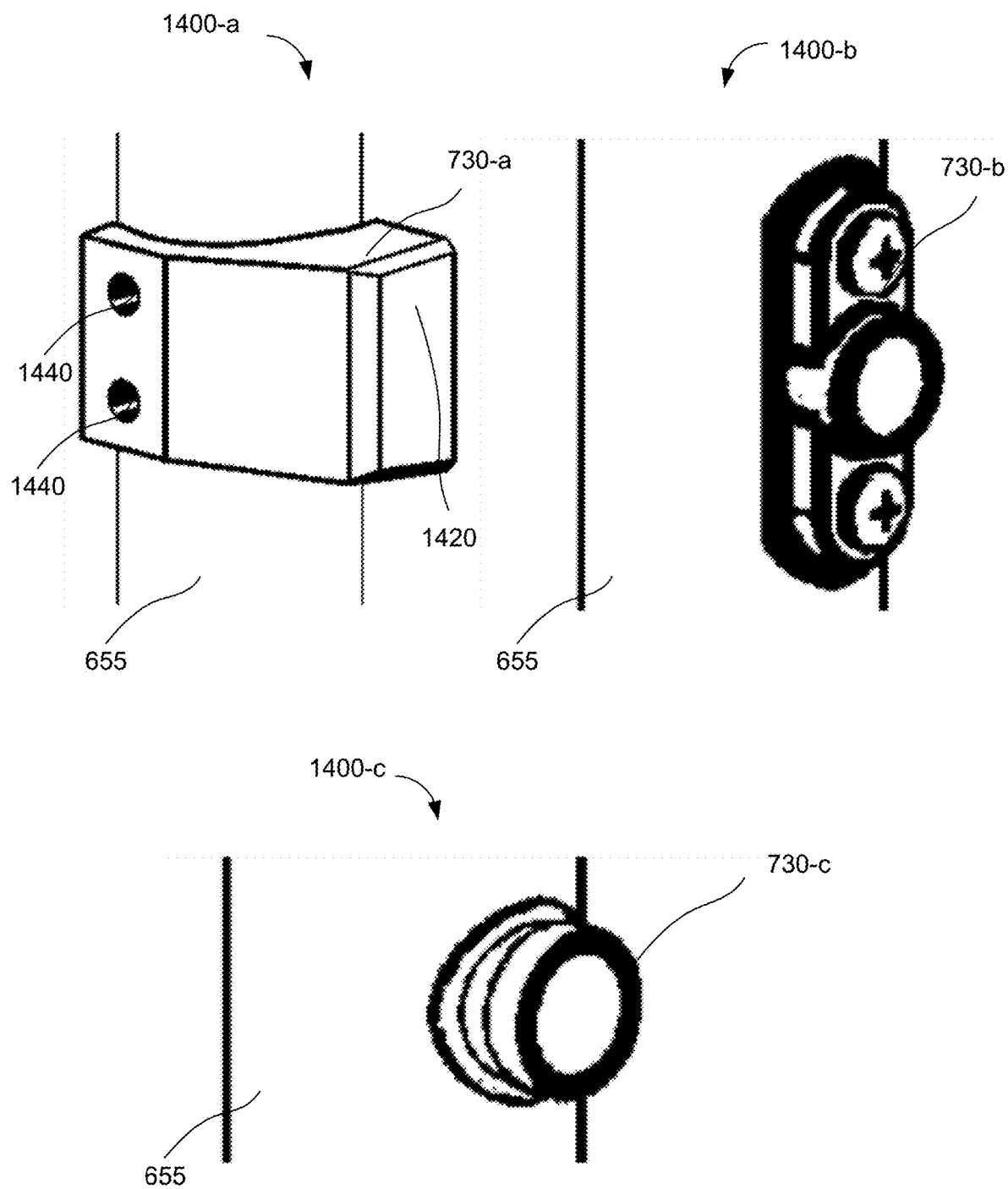
FIGS. 14-16 illustrate magnet housings in accordance with example embodiments.

FIG. 14 illustrates magnetic housings 730-*a*-730-*c* in accordance with example embodiments. Referring to FIG. 14, magnetic housings 730-*a*-730-*c* are installed to respective lock bars 655 of a cargo container. Magnetic housing 730 (e.g., magnetic housing 730-*a*-730-*c*) can be installed substantially adjacent to cargo-sensing unit 400. When the locking bar 655 is rotated (i.e., indicating that the cargo door 650 is being opened), a magnet held by the magnetic housing 730 can activate a reed switch within cargo-sensing unit 100, signaling cargo-sensing unit 100 to capture images and/or sensor data. 1400-*a* of FIG. 14 illustrates an embodiment of magnetic housing 730-*a* configured to partially surround lock bar 655. A magnet 1420 can be installed in a front portion of magnetic housing 730-*a* and magnetic housing 730-*a* can be secured to lock bar 655 utilizing screws 1440 inserted into lock bar 655 at a substantially divergent angle from the positioning of magnet 1420. In an embodiment, housing 730-*a* can require up-to a 0.75 inch gap between lock bar 655 and door 650 to ensure rotational clearance. 1400-*b* of FIG. 14 illustrates an embodiment of magnetic housing 730-*b* utilizing a magnet bracket. In an embodiment, housing 730-*b* can require up-to a 0.375 inch gap between lock bar 655 and door 650 to ensure rotational clearance. Magnetic housing 730-*b* will be discussed below in greater detail with reference to FIGS. 15A and 15B. 1400-*c* of FIG. 14 illustrates an embodiment of magnetic housing 730-*c* utilizing an encased magnet with threaded stud. In an embodiment, housing 730-*c* can require up-to a 0.31 inch gap between lock bar 655 and door 650 to ensure rotational clearance. Magnetic housing 730-*b* will be discussed below in greater detail with reference to FIG. 16.

Figure 15A:
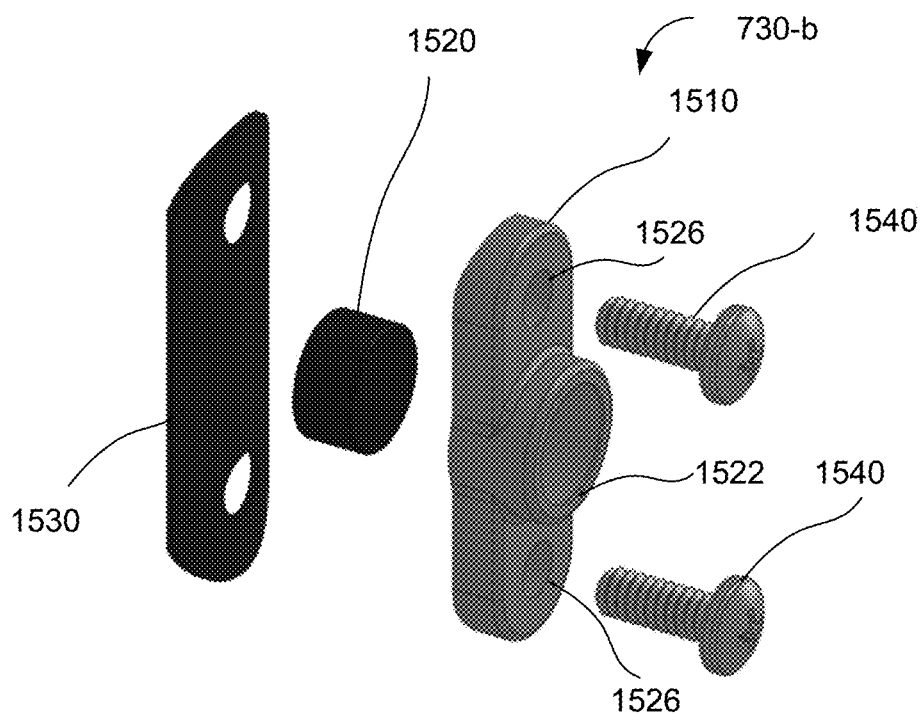
Figure 15B:
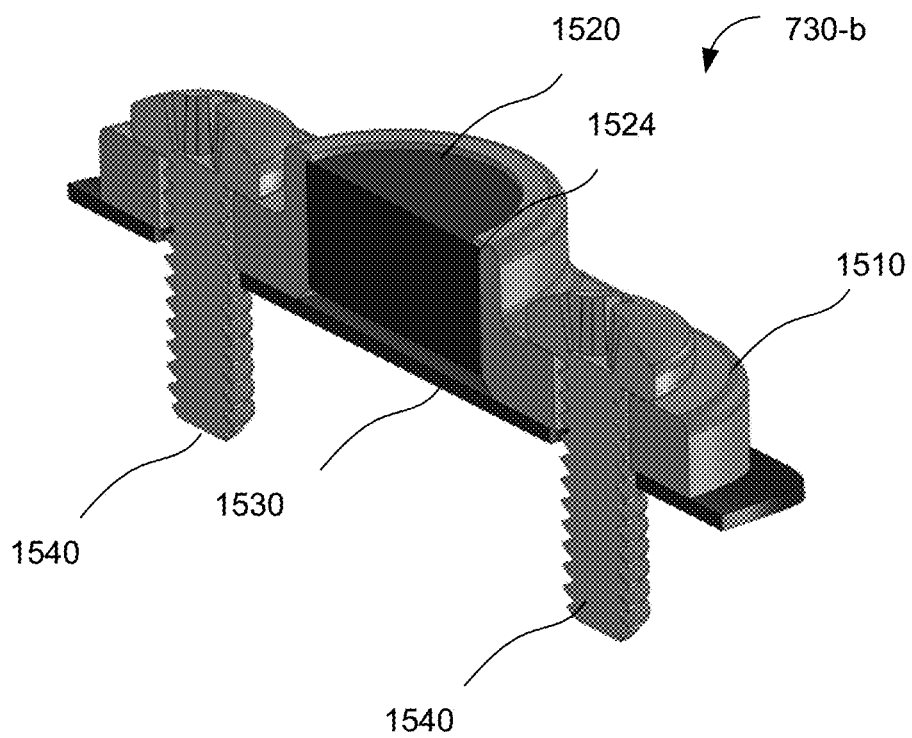

FIG. 15A is an exploded view of magnetic housing 730-*b* in accordance with an example embodiment. FIG. 15B is a cutaway view of magnetic housing 730-*b* in accordance with an example embodiment. Magnetic housing 730-*b* includes a magnet bracket 1510, a magnet 1520, an isolator washer 1530, and one or more securing screws 1540. Magnet bracket 1510 can be made, for example, of aluminum. Magnet bracket 1510 can include a volume 1522 for receiving magnet 1520. A lip 1524 can secure one side of magnet 1520 within the volume 1522. Magnet bracket 1510 can include receiving holes 1526 to receive one or more securing screws 1540. Isolator washer 1530 can be positioned on a backside of magnet bracket 1510 (e.g., between lock bar 655 and magnet bracket 1510 and/or magnet 1520. Isolator washer 1530 can be made, for example, of rubber, silicone, or some alternative insulator to reduce interactions and/or interference between magnet 1520 and locking bar 655, and to reduce galvanic corrosion. Securing screws 1540 can secure magnet bracket 1510, isolator washer 1530, and magnet 1520 to lock bar 655. A silicon adhesive and/or sealant can adhere magnet bracket 1510 to magnet 1520 and isolator washer 1530 and magnet 1520 to isolator 1530. Additionally, a layer of silicon sealant can protect magnet 1520 from, for example, elemental damage, impact, and galvanic corrosion.

Figure 16:
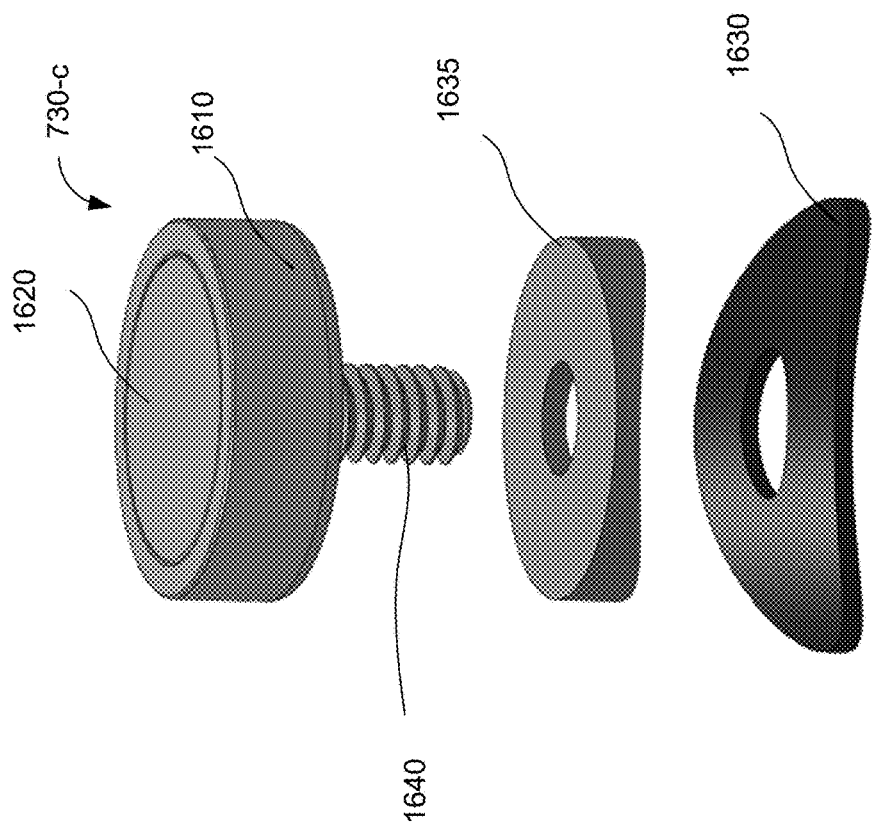

FIG. 16 is an exploded view of magnetic housing 730-*c* in accordance with an example embodiment. Magnetic housing 730-*c* includes a magnet 1620 encased in a housing 1610 with a threaded screw 1640, an isolator washer 1630, and a saddle washer 1635. Housing 1610 can be made, for example, of aluminum. Housing 1610 can entrap magnet 1620 within an end of housing 730-*c*. Isolator washer 1630 can be positioned on a backside of housing 1610 (e.g., between lock bar 655 and housing 1610. Isolator washer 1630 can be made, for example, of rubber, silicone, or some alternative insulator to reduce interactions and/or interference between magnet 1620 and locking bar 655, and to reduce galvanic corrosion. Saddle washer 1635 can compensate for a curvature of locking bar 655, so that housing 1610 can operate against a substantially planar surface. Threaded screw 1640 can magnetic housing 7430-*c* to lock bar 655.

Although the above is discussed with reference to a distributed system environment, one of ordinary skill will understand that aspects of the present disclosure can be implemented in an integrated embodiment (e.g., all or substantially all aspects being implemented within a cargo-sensing unit) and/or various functions attributed to certain elements of the distributed system environment can be performed by other elements of the distributed system environment.

While certain example embodiments of the disclosed technology have been described above, it is to be understood that the disclosed technology is not to be limited to the disclosed embodiments, but on the contrary, is intended to cover various modifications and equivalent arrangements included within the scope of the appended claims and their equivalents. Although specific terms are employed herein, they are used in a generic and descriptive sense only and not for purposes of limitation. It is intended that each term contemplates its broadest meaning as understood by those skilled in the art and includes all technical equivalents that operate in a similar manner to accomplish a similar purpose.

In the above description, numerous specific details are set forth. However, it is to be understood that some embodiments of the disclosed technology can be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described can include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any provided definitions of terms, it is to be understood that as used in the specification and in the claims, the term "or" is intended to mean an inclusive "or." Further, the terms "a," "an," and "the" are intended to mean one or more unless specified otherwise or clear from the context to be exclusively directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

The materials described herein as making up the various elements of some example embodiments are intended to be illustrative only and not restrictive. Many suitable materials that would perform a same or a similar function as the materials described herein are intended to be embraced within the scope of the present disclosure. Such other materials not described herein can include, but are not limited to, materials that are developed after the time of the development of the invention.

This written description uses examples to disclose certain example embodiments of the disclosed technology, including the best mode, and also to enable any person skilled in the art to practice certain embodiments of the disclosed technology, including making and using any devices or systems and performing any incorporated methods. The scope of certain embodiments of the disclosed technology is defined in the claims and their equivalents, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The following characterizing clauses are further provided as an additional description. The inclusion of reference numbers is the following clauses is to facilitate understanding of an exemplary embodiment but should not be considered limiting in any way.

Clause 1: A cargo-sensing unit including: an image sensor; a transceiver; at least one processor; and a memory having stored thereon computer program code that, when executed by the processor, controls the at least one processor to: receive, from a controlling server and through the transceiver, an instruction to capture an image of cargo space within a cargo container; control the image sensor to capture an image of the cargo space in response to receiving the instruction; and operate in accordance with a determined cargo container status based on an analysis of the captured image.

Clause 2: The cargo-sensing unit of Clause 1, wherein the instruction to capture the image includes an image capturing schedule, and the computer program code controls the at least one processor to instruct the image sensor to capture image of the cargo space in accordance to the image capturing schedule.

Clause 3: The cargo-sensing unit of Clauses 1 or 2, wherein the computer program code controls the at least one processor to determine the cargo container status by applying a classification model to the captured image.

Clause 4: The cargo-sensing unit of Clause 3, wherein the classification model determines whether cargo has shifted within the cargo container.

Clause 5: The cargo-sensing unit of Clause 4, wherein the computer program code controls the at least one processor to receive, from a modeling server and through the transceiver, the classification model.

Clause 6: The cargo-sensing unit of Clause 5, wherein the computer program code controls the at least one processor to output, through the transceiver, the captured image to the modeling server, the modeling server being configured to modify the classification model based on the captured image.

Clause 7: The cargo-sensing unit of Clauses 5 or 6, wherein the computer program code controls the at least one processor to output, through the transceiver, the captured image to the modeling server, the modeling server being configured to perform a secondary analysis of the captured image.

Clause 8: The cargo-sensing unit of any of Clauses 1-7, wherein the computer program code further controls the at least one processor to: receive, from a weight sensor within the cargo container, indications of a shift of cargo within the cargo container; and control the image sensor to capture an image of a cargo space within a cargo container in response to receiving the indications of the shift of the cargo.

Clause 9: A cargo-sensor controlling server including: a transceiver; at least one processor; and a memory having stored thereon computer program code that, when executed by the processor, controls the at least one processor to: receive, from a cargo-sensing unit and through the transceiver, cargo container status information of a cargo container; output, to the cargo-sensing unit and through the transceiver, an instruction to capture an image of cargo space within the cargo container; and receive, from the cargo-sensing unit and through the transceiver, a captured image of the cargo space.

Clause 10: The cargo-sensor controlling server of Clause 9, wherein the computer program code further controls the at least one processor to: receive, from a user device, a request to view the cargo space; and output the captured image of the cargo space to the user device.

Clause 11: The cargo-sensor controlling server of Clause 10, wherein the instruction to capture the image of cargo space is output in response to receiving the request from the user device.

Clause 12: The cargo-sensor controlling server of Clause 10 or 11, wherein the computer program code controls the at least one processor to a most recent captured image to the user device in response to receiving the request from the user device.

Clause 13: The cargo-sensor controlling server of any of Clauses 9-12, wherein the computer program code controls the at least one processor to output, to the cargo-sensing unit and through the transceiver, the instruction to capture an image of the cargo space based on an image capturing schedule.

Clause 14: The cargo-sensor controlling server of Clause 13, wherein the computer program code controls the at least one processor to receive, from a user device, an indication to adjust the image capturing schedule.

Clause 15: A cargo-monitoring method including: receiving, from a cargo-sensing unit, cargo container status information of a cargo container; transmitting, to the cargo-sensing unit, an instruction to capture an image of cargo space within the cargo container; and receiving, from the cargo-sensing unit, a captured image of the cargo space.

Clause 16: The cargo-monitoring method of Clause 15 further including analyzing the captured image to determine cargo container status, the cargo container status including at least one from among a cargo load quality, a cargo load type, and a cargo load percentage.

Clause 17: The cargo-monitoring method of Clause 16 further including determining, based on the cargo container status, cargo unloading requirements for cargo in the cargo container, the cargo unloading requirements including at least one from among, space requirements to store the cargo, devices necessary to unload the cargo, and recommended number of workers to unload the cargo.

Clause 18: The cargo-monitoring method of Clauses 16 or 17 wherein determining the cargo load quality includes classifying the captured image, utilizing a trained classifier model, to determine the cargo load quality.

Clause 19: The cargo-monitoring method of Clause 18 further including: detecting, from the captured image, a cargo shift; and updating, in response to detecting the cargo shift, the trained classifier model with a previous image of the cargo space.

Clause 20: The cargo-monitoring method of any of Clauses 15-19 further including: receiving, from one or more cargo sensors, an indication of movement of cargo within the cargo container; and capturing an image of the cargo space in response to receiving the indication of the movement of the cargo.

What is claimed is:

1. A cargo-sensing unit comprising:
   an image sensor;
   a transceiver;
   at least one processor; and
   a memory having stored thereon computer program code that, when executed by the processor, controls the at least one processor to:
     receive, from a controlling server and through the transceiver, an instruction to capture an image of cargo space within a cargo container;
     control the image sensor to capture an image of the cargo space in response to receiving the instruction;
     operate in accordance with a determined cargo container status based on an analysis of the captured image; and
     in response to a cargo shift being detected, from the captured image, update a trained classifier model with a previous image of the cargo space.

2. The cargo-sensing unit of claim 1, wherein
   the instruction to capture the image comprises an image capturing schedule, and
   the computer program code controls the at least one processor to instruct the image sensor to capture image of the cargo space in accordance to the image capturing schedule.

3. The cargo-sensing unit of claim 1, wherein the computer program code controls the at least one processor to determine the cargo container status by applying a classification model to the captured image.

4. The cargo-sensing unit of claim 3, wherein the classification model determines whether cargo has shifted within the cargo container.

5. The cargo-sensing unit of claim 4, wherein the computer program code controls the at least one processor to receive, from a modeling server and through the transceiver, the classification model.

6. The cargo-sensing unit of claim 5, wherein the computer program code controls the at least one processor to output, through the transceiver, the captured image to the modeling server, the modeling server being configured to modify the classification model based on the captured image.

7. The cargo-sensing unit of claim 5, wherein the computer program code controls the at least one processor to output, through the transceiver, the captured image to the modeling server, the modeling server being configured to perform a secondary analysis of the captured image.

8. The cargo-sensing unit of claim 1, wherein the computer program code further controls the at least one processor to:
   receive, from a weight sensor within the cargo container, indications of a shift of cargo within the cargo container; and
   control the image sensor to capture an image of a cargo space within a cargo container in response to receiving the indications of the shift of the cargo.

9. A cargo-sensor controlling server comprising:
   a transceiver;
   at least one processor; and
   a memory having stored thereon computer program code that, when executed by the processor, controls the at least one processor to:
     receive, from a cargo-sensing unit and through the transceiver, cargo container status information of a cargo container;
     output, to the cargo-sensing unit and through the transceiver, an instruction to capture an image of cargo space within the cargo container;
     receive, from the cargo-sensing unit and through the transceiver, a captured image of the cargo space;
     detect, from the captured image, a cargo shift and
     update, in response to detecting the cargo shift, a trained classifier model with a previous image of the cargo space.

10. The cargo-sensor controlling server of claim 9, wherein the computer program code further controls the at least one processor to:
    receive, from a user device, a request to view the cargo space; and
    output the captured image of the cargo space to the user device.

11. The cargo-sensor controlling server of claim 10, wherein the instruction to capture the image of cargo space is output in response to receiving the request from the user device.

12. The cargo-sensor controlling server of claim 10, wherein the computer program code controls the at least one processor to a most recent captured image to the user device in response to receiving the request from the user device.

13. The cargo-sensor controlling server of claim 9, wherein the computer program code controls the at least one processor to output, to the cargo-sensing unit and through the transceiver, the instruction to capture an image of the cargo space based on an image capturing schedule.

14. The cargo-sensor controlling server of claim 13, wherein the computer program code controls the at least one processor to receive, from a user device, an indication to adjust the image capturing schedule.

15. A cargo-monitoring method comprising:
receiving, from a cargo-sensing unit, cargo container status information of a cargo container;
transmitting, to the cargo-sensing unit, an instruction to capture an image of cargo space within the cargo container;
receiving, from the cargo-sensing unit, a captured image of the cargo space;
detecting, from the captured image, a cargo shift and
updating, in response to detecting the cargo shift, a trained classifier model with a previous image of the cargo space.

16. The cargo-monitoring method of claim 15 further comprising analyzing the captured image to determine cargo container status, the cargo container status comprising at least one from among a cargo load quality, a cargo load type, and a cargo load percentage.

17. The cargo-monitoring method of claim 16 further comprising determining, based on the cargo container status, cargo unloading requirements for cargo in the cargo container, the cargo unloading requirements comprising at least one from among, space requirements to store the cargo, devices necessary to unload the cargo, and recommended number of workers to unload the cargo.

18. The cargo-monitoring method of claim 16 wherein determining the cargo load quality comprises classifying the captured image, utilizing the trained classifier model, to determine the cargo load quality.

19. The cargo-monitoring method of claim 15 further comprising:
receiving, from one or more cargo sensors, an indication of movement of cargo within the cargo container; and
capturing an image of the cargo space in response to receiving the indication of the movement of the cargo.

* * * * *